US012711732B2

(12) United States Patent
Kaneko et al.

(10) Patent No.: US 12,711,732 B2
(45) Date of Patent: Aug. 18, 2026

(54) IMAGE PROCESSING DEVICE AND IMAGE PROCESSING METHOD

(71) Applicant: NEC Corporation, Tokyo (JP)

(72) Inventors: Eiji Kaneko, Tokyo (JP); Masato Toda, Tokyo (JP)

(73) Assignee: NEC CORPORATION, Tokyo (JP)

(*) Notice: Subject to any disclaimer, the term of this patent is extended or adjusted under 35 U.S.C. 154(b) by 326 days.

(21) Appl. No.: 18/567,418

(22) PCT Filed: Jun. 10, 2021

(86) PCT No.: PCT/JP2021/022072
§ 371 (c)(1),
(2) Date: Dec. 6, 2023

(87) PCT Pub. No.: WO2022/259451
PCT Pub. Date: Dec. 15, 2022

(65) Prior Publication Data
US 2024/0273860 A1 Aug. 15, 2024

(51) Int. Cl.
*G06V 10/75* (2022.01)
*G06T 5/30* (2006.01)
(Continued)

(52) U.S. Cl.
CPC .............. *G06V 10/751* (2022.01); *G06T 5/30* (2013.01); *G06T 5/50* (2013.01); *G06T 5/77* (2024.01);
(Continued)

(58) Field of Classification Search
CPC .. G06V 10/751; G06V 10/754; G06V 10/761; G06V 20/13; G06V 10/457;
(Continued)

(56) References Cited

U.S. PATENT DOCUMENTS

2010/0104185 A1* 4/2010 Johnson .................. G06T 7/277 382/173
2010/0303340 A1* 12/2010 Abraham ................ G06T 7/285 382/154
(Continued)

FOREIGN PATENT DOCUMENTS

JP 2011-209780 A 10/2011
JP 2011-259324 A 12/2011
(Continued)

OTHER PUBLICATIONS

Merkle, N., Luo, W., Auer, S., Müller, R., & Urtasun, R. (2017). Exploiting deep matching and SAR data for the geo-localization accuracy improvement of optical satellite images. Remote Sensing, 9(6), 586. https://doi.org/10.3390/rs9060586 (Year: 2017).*
(Continued)

*Primary Examiner* — John Villecco
*Assistant Examiner* — Kyla Guan-Ping Tiao Allen
(74) *Attorney, Agent, or Firm* — Sughrue Mion, PLLC

(57) ABSTRACT

The image processing device includes a change area detection unit which detects a change area, where an object has changed compared to the first image, in the second image obtained by observing the same observed area as an observed area in the first image, an image correction unit which performs a correction process to make the change area in the second image smaller relative to a non-change area where the object has not changed, and an image pair output unit which outputs an image pair of the second image processed by the image correction unit and the first image.

8 Claims, 17 Drawing Sheets

(51) Int. Cl.

| | |
|---|---|
| ***G06T 5/50*** | (2006.01) |
| ***G06T 5/77*** | (2024.01) |
| ***G06T 7/254*** | (2017.01) |
| ***G06V 10/74*** | (2022.01) |
| ***G06V 20/13*** | (2022.01) |

(52) U.S. Cl.
CPC .......... *G06V 10/754* (2022.01); *G06V 10/761* (2022.01); *G06T 2207/10044* (2013.01); *G06T 2207/20212* (2013.01); *G06V 20/13* (2022.01)

(58) Field of Classification Search
CPC .................. G06V 20/176; G06T 7/254; G06T 2207/20036; G06T 2207/30184; G06T 2207/30232; G06T 2207/30236; G06T 2207/10044; G06T 2207/20212; G06T 5/30; G06T 5/50; G06T 5/77
See application file for complete search history.

(56) References Cited

U.S. PATENT DOCUMENTS

2011/0085027 A1* 4/2011 Yamashita .............. G06T 7/223 348/E13.074
2011/0103644 A1* 5/2011 Garten ...................... G06T 5/50 382/103
2012/0154388 A1* 6/2012 Suzuki ................. H04N 13/106 345/419
2014/0099021 A1* 4/2014 Bian ....................... G06T 7/194 382/164
2015/0131851 A1 5/2015 Bernal et al.
2016/0347251 A1* 12/2016 Shigemura ............. G06V 20/58
2021/0241509 A1* 8/2021 Li ........................ G06V 10/462
2021/0377457 A1* 12/2021 Kobayashi ............. G06V 10/25

FOREIGN PATENT DOCUMENTS

JP 2013-143069 A 7/2013
JP 2016-042066 A 3/2016
JP 2019-185281 A 10/2019
WO 2019/191142 A1 10/2019

OTHER PUBLICATIONS

Extended European Search Report for EP Application No. 21945127.5, dated on Jun. 6, 2024.
International Search Report for PCT Application No. PCT/JP2021/022072, mailed on Sep. 7, 2021.
P. Isola et al., "Image-to-image translation with conditional adversarial networks", in Proc. Conference on Computer Vision and Pattern Recognition, 2017, pp. 1-17.
M. Schmitt et al., "The SEN 1-2 dataset for deep learning in SAR-optical data fusion", ISPRS Annals of the Photogrammetry, Remote Sensing and Spatial Information Sciences, vol. IV-1, 2018, pp. 141-146.

* cited by examiner t1
100
ORBIT A
120
t2
100
ORBIT B
120
IMAGE A
(FIRST OBJECT MAP)
111
91
92
93
IMAGE B
(SECOND OBJECT MAP)
121
94
93
DIFFERENCE
MAP
GENERATION
150
CORRECT
DIFFERENCE MAP

150
OPENING
140

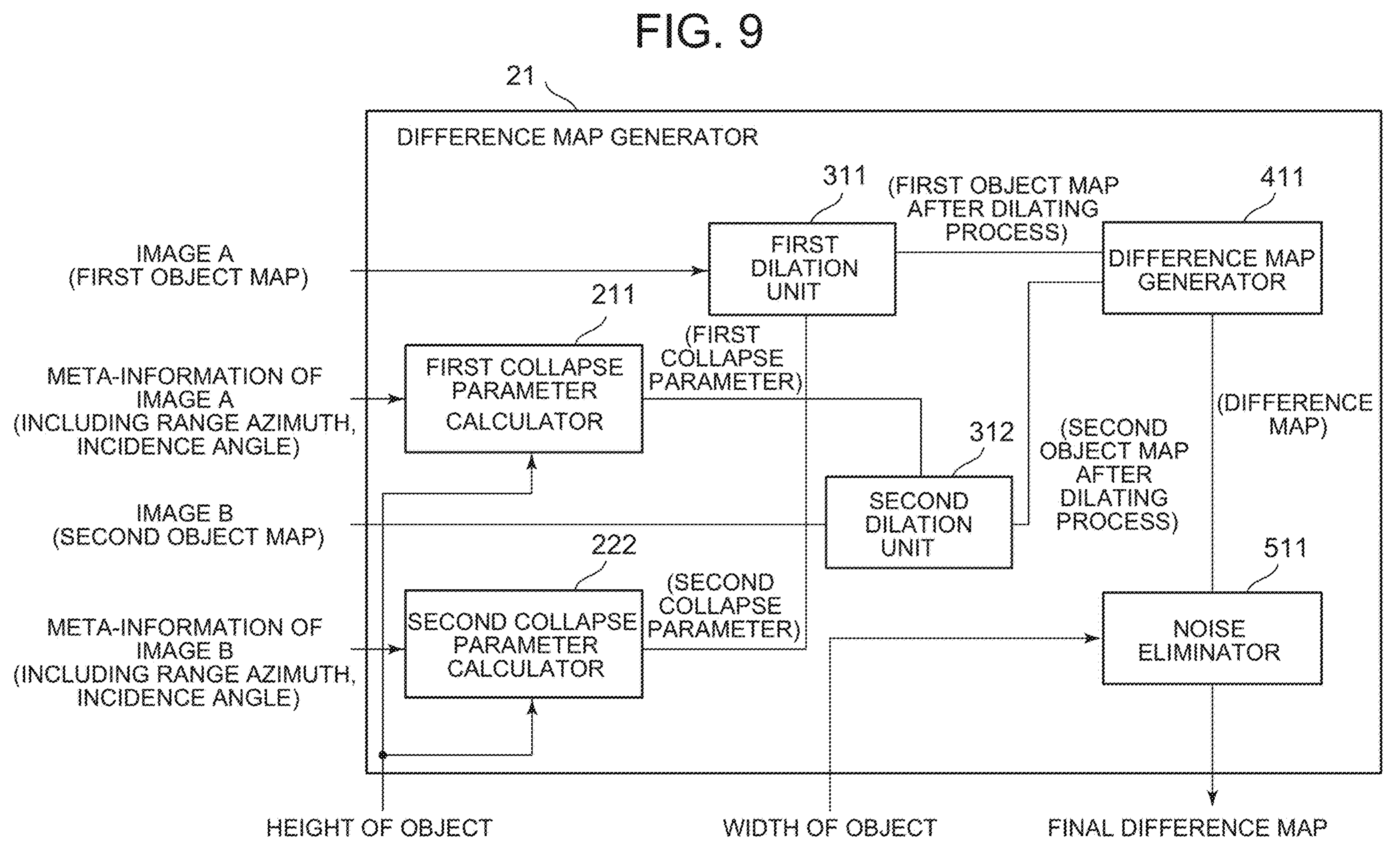
FIG. 9
21
DIFFERENCE MAP GENERATOR
IMAGE A (FIRST OBJECT MAP)
META-INFORMATION OF IMAGE A (INCLUDING RANGE AZIMUTH, INCIDENCE ANGLE)
IMAGE B (SECOND OBJECT MAP)
META-INFORMATION OF IMAGE B (INCLUDING RANGE AZIMUTH, INCIDENCE ANGLE)
211
FIRST COLLAPSE PARAMETER CALCULATOR
222
SECOND COLLAPSE PARAMETER CALCULATOR
(FIRST COLLAPSE PARAMETER)
(SECOND COLLAPSE PARAMETER)
311
FIRST DILATION UNIT
312
SECOND DILATION UNIT
(FIRST OBJECT MAP AFTER DILATING PROCESS)
(SECOND OBJECT MAP AFTER DILATING PROCESS)
411
DIFFERENCE MAP GENERATOR
(DIFFERENCE MAP)
511
NOISE ELIMINATOR
HEIGHT OF OBJECT
WIDTH OF OBJECT
FINAL DIFFERENCE MAP

FIG. 13

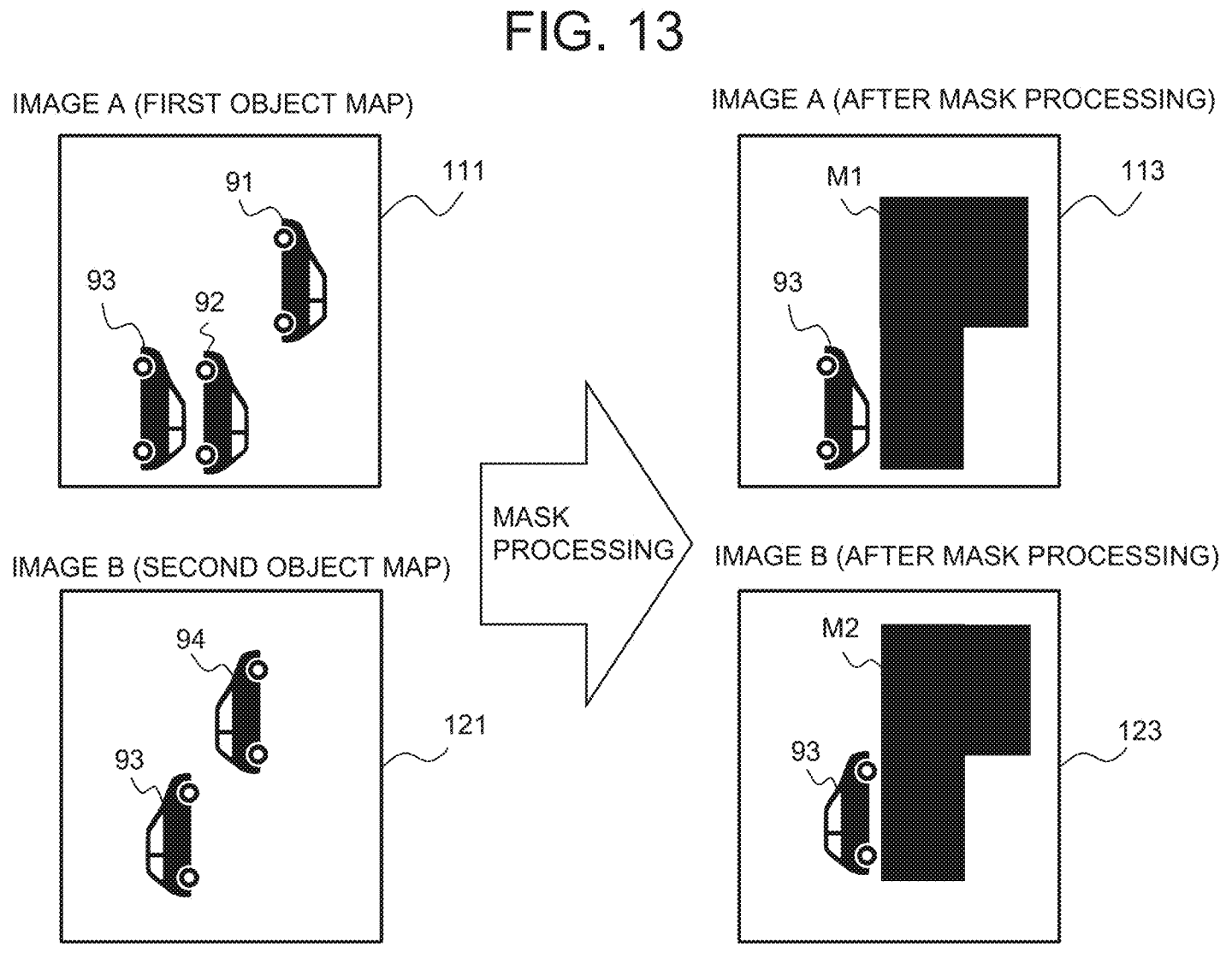

IMAGE A (FIRST OBJECT MAP)
111
91
92
93

IMAGE B (SECOND OBJECT MAP)
121
94
93

MASK PROCESSING

IMAGE A (AFTER MASK PROCESSING)
113
M1
93

IMAGE B (AFTER MASK PROCESSING)
123
M2
93

FIG. 16

IMAGE PROCESSING DEVICE AND IMAGE PROCESSING METHOD

This application is a National Stage Entry of PCT/JP2021/022072 filed on Jun. 10, 2021, the contents of all of which are incorporated herein by reference, in their entirety.

TECHNICAL FIELD

The invention relates to an image processing device and an image processing method that corresponds one image to an image taken of the same area as the shooting area of the image.

BACKGROUND ART

In order to understand damage situation based on disaster such as a flood, a forest fire, a volcanic eruption, an earthquake, a tsunami or a drought, situation of urban development, or movement and retention of cargoes and people, a change detection technology is utilized which detects areas where the ground surface conditions have changed, based on images taken from high locations, for example, images taken by a satellite.

Synthetic aperture radar (SAR) technology is a technology which can obtain an image (hereinafter referred to as a SAR image) equivalent to an image by an antenna having a large aperture, when a flying object such as artificial satellite, aircraft, or the like transmits and receives a radio wave while the flying object moves. The synthetic aperture radar is utilized, for example, for analyzing a ground surface displacement by signal-processing reflected waves from the ground surface, etc.

Hereinafter, an image taken by a satellite, etc. is referred to as an observed image. Unless otherwise specified, both optical and SAR images are acceptable for an observed image.

Generally, in change detection, two images obtained by observing the same area at different times are compared. By comparing two images, a change of one or more bodies (objects) in the area is detected. A change of an object may be, for example, appearance of a new object or disappearance of an object. Hereinafter, each of the two images is referred to as an object presence image or an object map, and the two images are sometimes referred to as an image pair. An image capable of identifying a difference part between two images based on the comparison of the two images is sometimes referred to as a difference map.

By superimposing two SAR images obtained by observing the same area on the ground at different times, a synthesized image is generated in which changes of objects in the area are visible. Therefore, the synthesized image corresponds to an image in which the taken area is visualized.

CITATION LIST

Non Patent Literature

NPL 1: P. Isola et al., "Image-to-image translation with conditional adversarial networks", in Proc. Conference on Computer Vision and Pattern Recognition, 2017

NPL 2: M. Schmitt et al., "The SEN1-2 dataset for deep learning in SAR-optical data fusion", ISPRS Annals of the Photogrammetry, Remote Sensing and Spatial Information Sciences, vol. IV-1, 2018, pp. 141-146

SUMMARY OF INVENTION

Technical Problem

A frequency of analysis of ground surface displacement, etc., are desirable. The frequency of analysis can be increased by collecting a large number of images of the same area observed.

In order to collect a large number of images, it is conceivable to use SAR images together with optical images. However, in general, the flying object that takes SAR images is a different flying object from the flying object that takes optical images. Therefore, it is not easy to collect a large number of SAR images and a large number of optical images of the same area. Even if SAR images and optical images of the same area are obtained, objects are taken differently. Therefore, even if the SAR image and the optical image are superimposed, a favorable synthesized image cannot be obtained. That is because the reliability of the synthesized image will be low when the state of the object, etc., in the SAR image and the state of the object, etc., in the optical image do not match. In other words, the collection of a large number of images suitable for generating a synthesized image is inhibited.

Attempts have been made to convert SAR images to optical images using machine learning. For example, non-patent literature 1 discloses the conversion of SAR images to optical images by an image converter using pix2pix. When training an image converter using pix2pix, a data set of images is needed as training data. Non-patent literature 2 discloses use of the Sen1-2 dataset generated from the image data of Sentinel-1 (SAR satellite) and Sentinel-2 (optical satellite) of the European Space Agency. Images from the same season and the same area are selected from the data sets. For the optical images, images that do not contain clouds or shadows are selected. Then, the optical image and the SAR image converted to the optical image are superimposed.

However, when superimposing optical images and SAR images converted to optical images, it is required to train an image converter and select appropriate images. Therefore, it takes time and effort to obtain a synthesized image. In addition, when the state of the object, etc., in the SAR image (SAR image converted to optical image) and the state of the object, etc., in the optical image do not match, a desirable synthesized image cannot be obtained even if they are superimposed. In other words, the collection of a large number of images suitable for generating a synthesized image is inhibited.

It is an object of the present invention to provide an image processing device and an image processing method that can collect a large number of images of the same area that can be used for analysis of ground surface displacement and the like.

Solution to Problem

An image processing device according to the present invention includes change area detection means for detecting a change area, where an object has changed compared to the first image, in the second image obtained by observing the same observed area as an observed area in the first image, image correction means for performing a correction process to make the change area in the second image smaller relative to a non-change area where the object has not changed, and image pair output means for outputting an image pair of the second image processed by the image correction means and the first image.

Another image processing device according to the present invention includes change area detection means for detecting a change area, where an object has changed compared to the first image, in the second image obtained by observing the same observed area as an observed area in the first image, matching degree calculation means for calculating a matching degree between the first image and the second image based on the size of the non-change area in the second image where the object has not changed, and image pair output means for outputting an image pair of the second image and the first image when the matching degree exceeds a predetermined value.

An image processing method according to the present invention includes detecting a change area, where an object has changed compared to the first image, in the second image obtained by observing the same observed area as an observed area in the first image, performing a correction process to make the change area in the second image smaller relative to a non-change area where the object has not changed, and outputting an image pair of the corrected processed second image and the first image.

Another image processing method according to the present invention includes detecting a change area, where an object has changed compared to the first image, in the second image obtained by observing the same observed area as an observed area in the first image, calculating a matching degree between the first image and the second image based on the size of the non-change area in the second image where the object has not changed, and outputting an image pair of the second image and the first image when the matching degree exceeds a predetermined value.

An image processing program according to the invention causes a computer to execute, a process of detecting a change area, where an object has changed compared to the first image, in the second image obtained by observing the same observed area as an observed area in the first image, a process of performing a correction process to make the change area in the second image smaller relative to a non-change area where the object has not changed, and a process of outputting an image pair of the corrected processed second image and the first image.

Another image processing program according to the invention causes a computer to execute, a process of detecting a change area, where an object has changed compared to the first image, in the second image obtained by observing the same observed area as an observed area in the first image, a process of calculating a matching degree between the first image and the second image based on the size of the non-change area in the second image where the object has not changed, and a process of outputting an image pair of the second image and the first image when the matching degree exceeds a predetermined value.

Advantageous Effects of Invention

According to the present invention, it is possible to collect a large number of images of the same area that can be used for analysis of ground surface displacement, etc.

BRIEF DESCRIPTION OF DRAWINGS

FIG. 9 It depicts a block diagram showing a configuration example of the difference map generator.

FIG. 13 It depicts an explanatory diagram for explaining mask processing.

FIG. 16 It depicts an explanatory diagram for explaining how one image in an image pair is generated.

DESCRIPTION OF EMBODIMENTS

Hereinafter, example embodiments of the present invention will be described with reference to the drawings.

Example Embodiment 1

Figure 1:
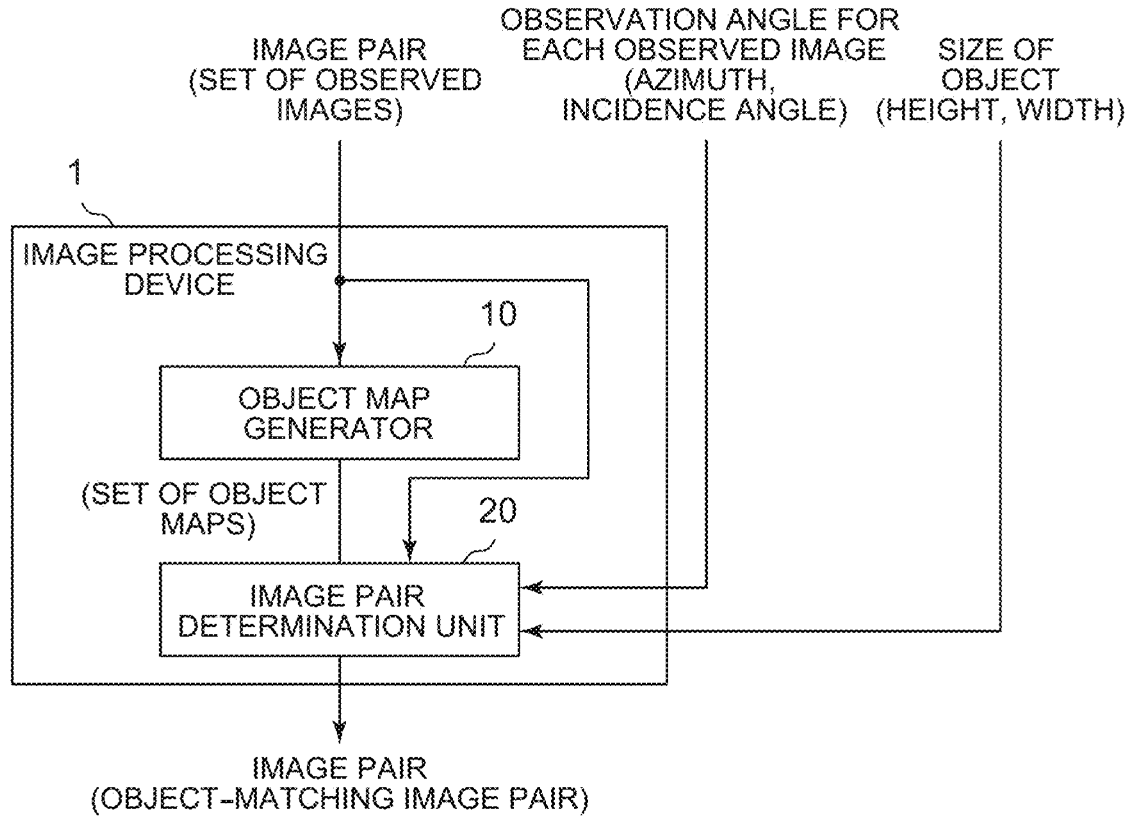
FIG. 1 It depicts a block diagram showing a configuration example of the image processing device of the first example embodiment.

FIG. 1 is a block diagram showing a configuration example of the image processing device of the first example embodiment. The image processing device 1 shown in FIG. 1 includes an object map generator 10 and an image pair determination unit 20.

A set of observed images is input to the object map generating means 10. The object map generator 10 extracts from each of the observed images an image (object presence image) including an object presence area in which an object that is a target of change detection is present. In other words, the object map generator 10 generates a set of object maps. The set of object maps correspond to the image pair described above. For example, the object map generator 10 extracts predetermined areas from the observed images. However, it is also possible to manually extract areas from the observed images.

The object map generator 10 may use other methods to generate an object presence image in which the object is present. For example, the object map generator 10 may input the object presence image to a neural network that has been trained in advance, and output the image obtained as an output as an object map where the object may be known.

The pair of observed images to be input to the object map generator 10 is selected from a group of images stored in the image database in advance, for example. When a pair of observed images is selected, the observed images of the same area are selected. It is preferred that the two selected observed images are the observed images taken in the same season. When an optical image is included in the pair of observed images, it is preferable that an image without clouds or shadows is selected.

An observation angle (azimuth and incidence angle) and a size (height and width) of the object in each of the observed images are input to the image pair determination unit 20. The size of the object is predetermined according to the object that is the target of change detection. The image pair determination unit 20 determines a matching degree (similarity) between two object maps, i.e., image pairs. Specifically, the image pair determination unit 20 determines whether or not the image pair is an image pair that can be used for change detection, etc. The image pair that can be used for change detection, etc., is an image pair in which two images are considered to have the same object in the image. Such an image pair is sometimes referred to as an object-matching image pair.

Figure 2:
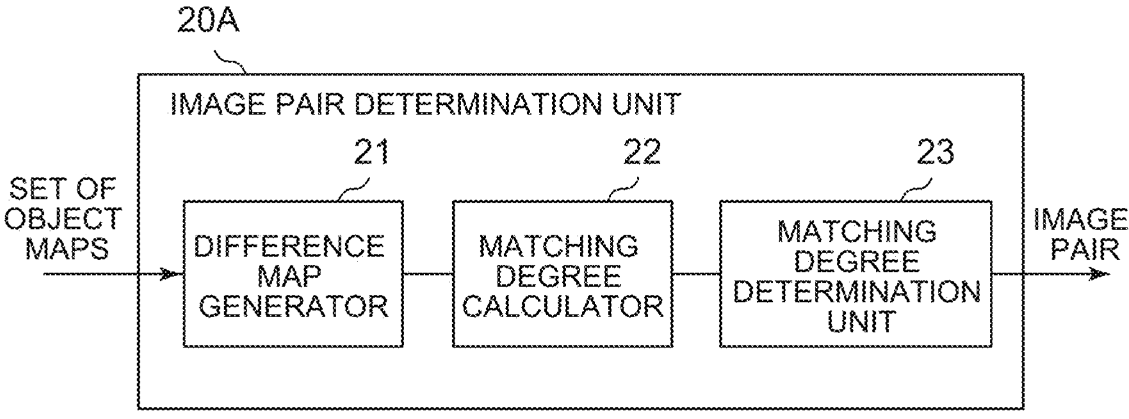
FIG. 2 It depicts a block diagram showing a configuration example of the image pair determination unit in the first example embodiment.

FIG. 2 is a block diagram showing a configuration example of the image pair determination unit. The image pair determination unit 20A shown in FIG. 2 includes a difference map generator 21, a matching degree calculator 22, and a matching degree determination unit 23. The image pair determination unit 20A shown in FIG. 2 corresponds to the image pair determination unit 20 shown in FIG. 1.

The difference map generator 21 deforms each object map based on the observed angle and the size of the object in each of the observed images. Further, the image pair determination unit 20A generates an image showing an area where the object has changed between the two object maps, i.e., an object difference map (hereinafter referred to as a difference map), by synthesizing the deformed object maps to generate a synthesized image.

The matching degree calculator 22 calculates the matching degree (similarity) between the two object maps, i.e., image pairs, using the difference map. The matching degree determination unit 23 determines whether the image pair input to the image processing unit 1 is an object-matching image pair or not by determining the calculated matching degree. The matching degree determination unit 23 outputs a result of the determination as to whether or not the image pair is an object-matching image pair. For example, when the determination result of the matching degree determination unit 23 is positive (i.e., when the matching degree determination unit 23 determines that the input image pair is an object-matching image pair), the matching degree determination unit 23 outputs the image pair as an object-matching image pair. The object-matching image pair is stored in a predetermined image database, for example.

Figure 3:
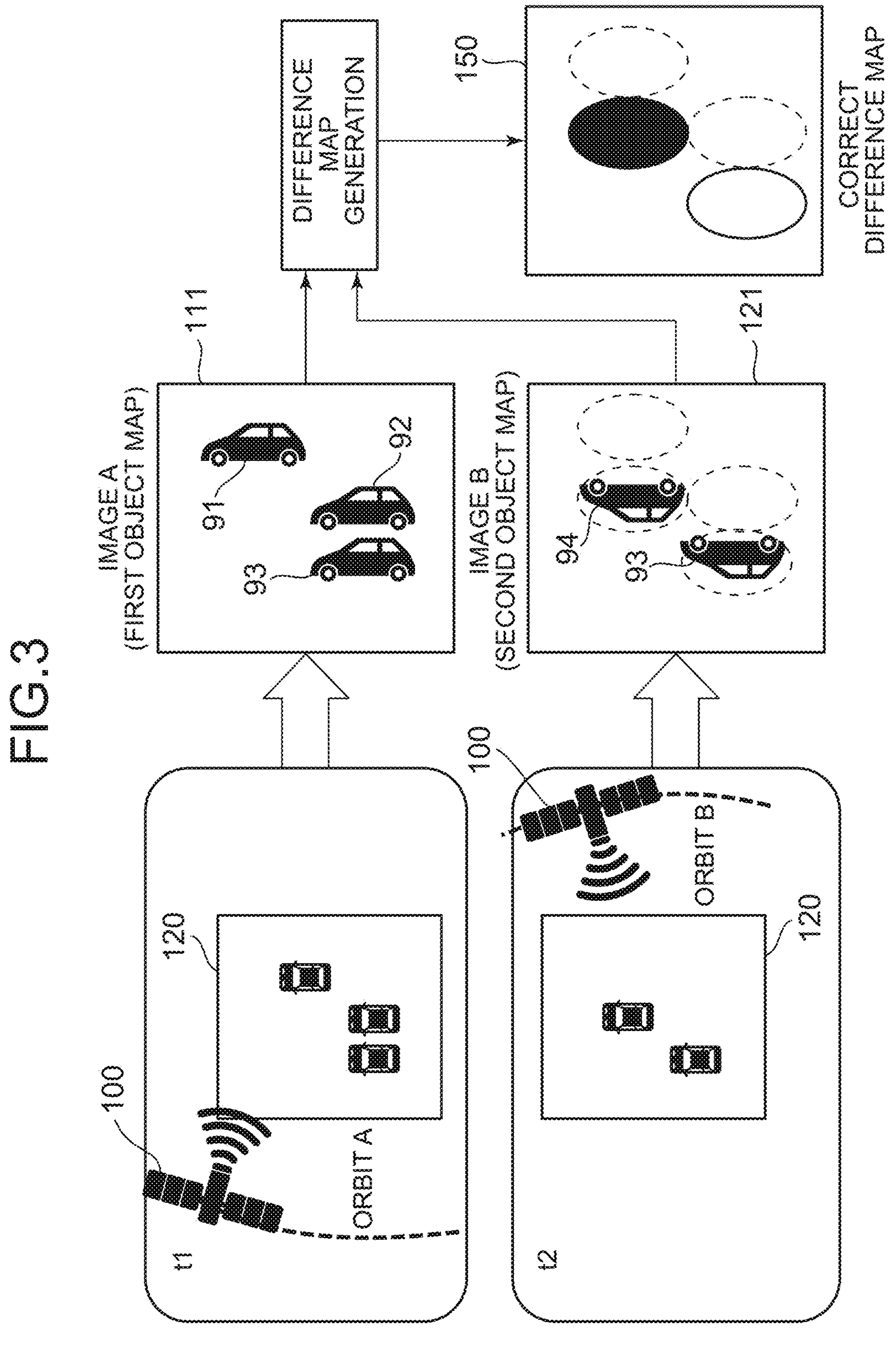
FIG. 3 It depicts an explanatory diagram showing an example of how a difference map is generated.

FIG. 3 is an explanatory diagram showing an example of how a difference map is generated. On the left side of the upper row of FIG. 3, an aspect is shown that a satellite 100 passing through the orbit A takes a picture of an area including a parking lot 120 at time t1. On the left side of the lower row of FIG. 3, an aspect is shown that a satellite 100 passing through the orbit B which is different from the orbit A takes a picture of the area including the parking lot 120 at time t2 which is different from time t1. The time t2 is later than the time t1.

On the center of the upper row of FIG. 3, an example of an image A (a first object map 111) obtained from the observed image at the time t1 is shown. Three automobiles 91, 92, 93 are present in the image A. On the center of the lower row of FIG. 3, an example of an image B (a second object map 121) obtained from the observed image at time t2 is shown. Two automobiles 93, 94 are present in the image B. At the time t2, the automobiles 91, 92, which were present at time t1, have disappeared. In addition, a new automobile 94 appears at time t2. In other words, a new automobile 94 has appeared between the time t1 and the time t2.

In this example, the first object map 111 and the second object map 121 correspond to images of the parking lot 120.

The difference map generator 21 generates a difference map 150 using the image A and the image B. In the difference map 150, the ellipse surrounded by a solid line indicates an area where the automobile 93 that has not changed from the time t1 to the time t2 exists. In other words, it indicates an area where there is no change. The black ellipse indicates an area where the newly appeared automobile 94 exists. The ellipses surrounded by dashed lines indicate areas where the disappeared automobiles 91, 92 existed. In other words, the black ellipse and the ellipse surrounded by a dashed line indicate a change area.

In the difference map 150, the change area and the non-change area can be distinguishable by a different expression than that illustrated in FIG. 3. As an example, a color difference may be used to distinguish the change area from the non-change area.

Figure 4A:
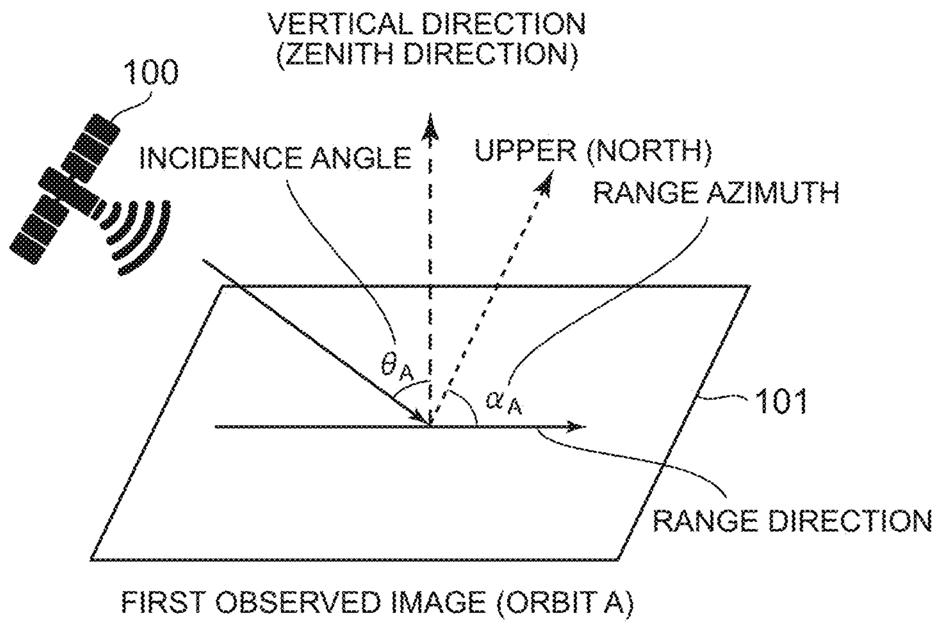
FIG. 4A It depicts an explanatory diagram for explaining an incidence angle and range azimuth of an electromagnetic wave.
Figure 4B:
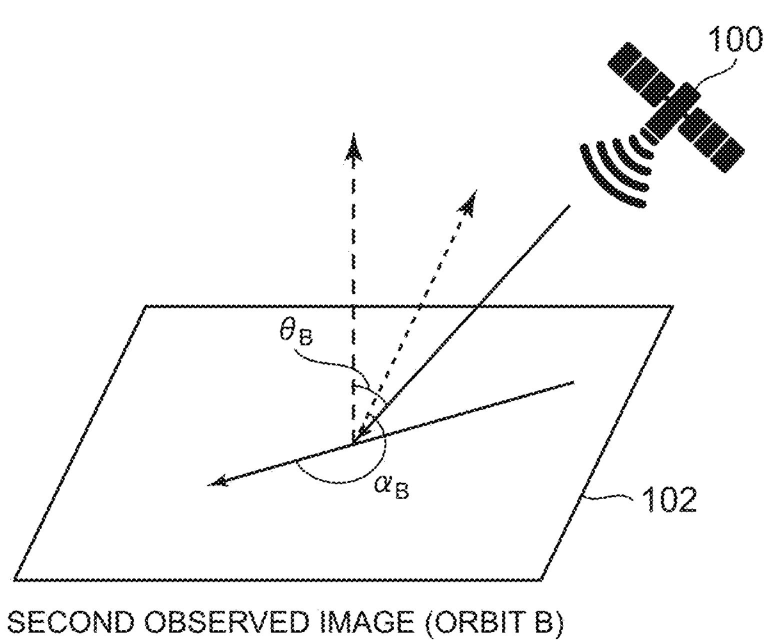
FIG. 4B It depicts an explanatory diagram for explaining an incidence angle and range azimuth of an electromagnetic wave.

FIGS. 4A and 4B are explanatory diagrams for explaining the incidence angle and the azimuth (range azimuth). FIGS. 4A and 4B show the first observed image 101 obtained in the orbit A and the second observed image 102 obtained in the orbit B which is different from the orbit A. For the first observed image 101 and the second observed image 102, the incident angles $\theta_A$, $\theta_B$ correspond to angles from the zenith direction to a direction of the satellite 100. The range azimuths $\alpha_A$, $\alpha_B$ correspond to angles in the range direction for a reference direction (for example, a north direction).

Figure 5:
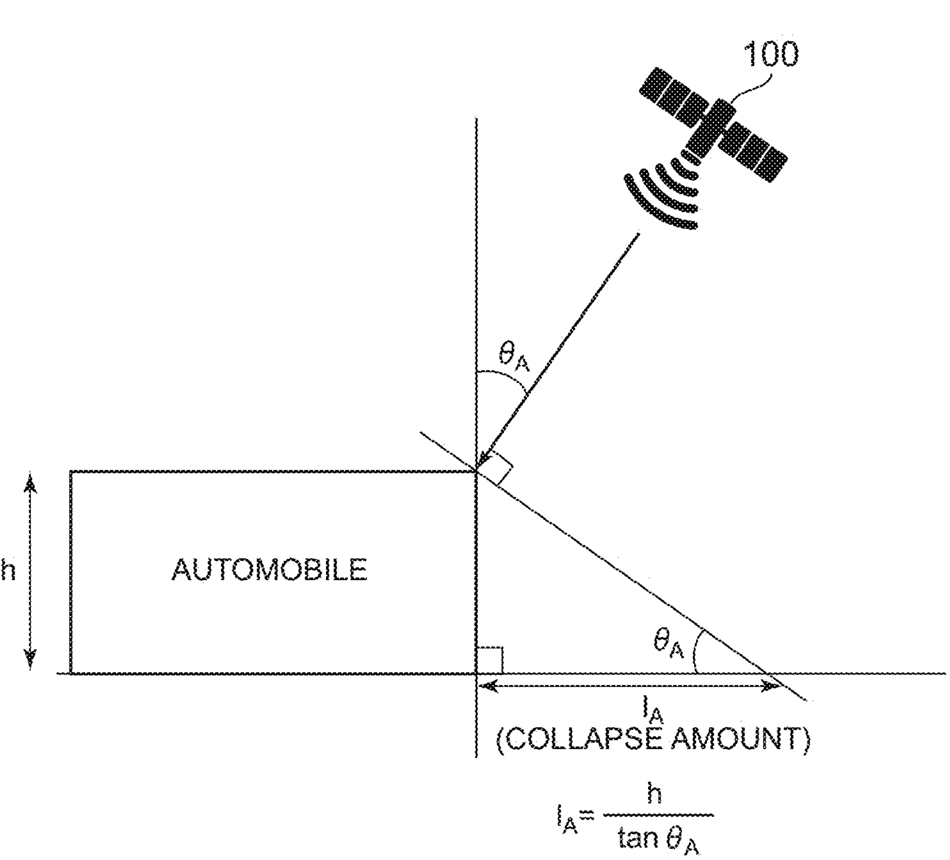
FIG. 5 It depicts an explanatory diagram for explaining a collapse amount.

FIG. 5 is an explanatory diagram for explaining a distance of collapse (collapse amount) 1A. Assuming that the height of the object (in this example, an automobile) is h and the incidence angle of the electromagnetic wave is $\theta_A$, the collapse amount $l_A$ is expressed by the following equation (1).

$$l_A = h/\tan\theta_A \tag{1}$$

When the observed image is an optical image, assuming that the incidence angle of sunlight is $\theta_A$, the collapse amount $l_A$ is expressed by the following equation (2).

$$l_A = h \cdot \tan\theta_A \tag{2}$$

Since the case of SAR images is used as an example in this example embodiment, hereinafter, the collapse amount with respect to the image A is denoted as $l_A$ and the collapse amount with respect to image B is denoted as $l_B$ ($l_B$=h/tan $\theta_B$). When an optical image is used, the collapse amount with respect to image B is $l_B$ ($l_B$=h/tan $\theta_B$).

Figures 6A, 6B:
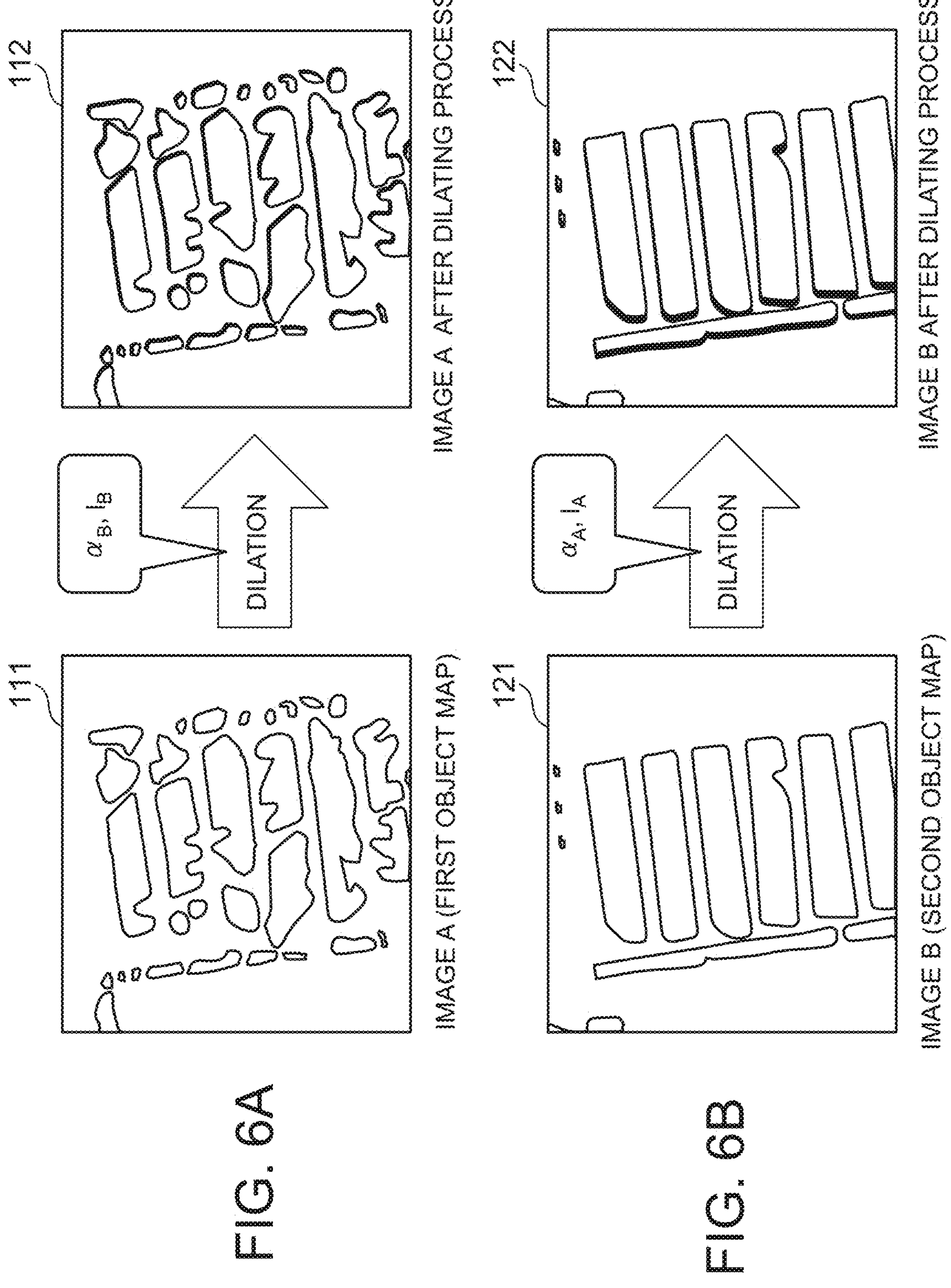
FIG. 6A It depicts an explanatory diagram for explaining a dilating process.
FIG. 6B It depicts an explanatory diagram for explaining a dilating process.

FIGS. 6A and 6B are explanatory diagrams for explaining a dilating process performed by the difference map generator 21.

As shown in FIGS. 6A and 6B, the difference map generator 21 performs a dilating process on the image A (the first object map 111) based on the first observed image 101 (refer to FIG. 4) obtained in the orbit A. In this example embodiment, the difference map generator 21 dilates an object (in this example, an automobile) appearing in the image A in the collapsing direction of the corresponding object in an image B by a length corresponding to the collapse amount of the object in the image B. As a result, an image A after the dilating process (the first object map 112 in which the object is dilated) is obtained. Further, the difference map generator 21 performs a dilating process on the image B (the first object map 121) based on the second observed image 102 (refer to FIG. 4) obtained in the orbit B. In this example embodiment, the difference map generator 21 dilates an object appearing in the image B in the collapsing direction of the corresponding object in the image A by a length corresponding to the collapse amount of the object in the image A. As a result, an image B after the dilating process (the second object map 122 in which the object is dilated) is obtained.

In the first object map 112 and the second object map 121 shown in FIGS. 6A and 6B, the black areas indicate areas which dilate, i.e., the dilating areas.

Figure 7:
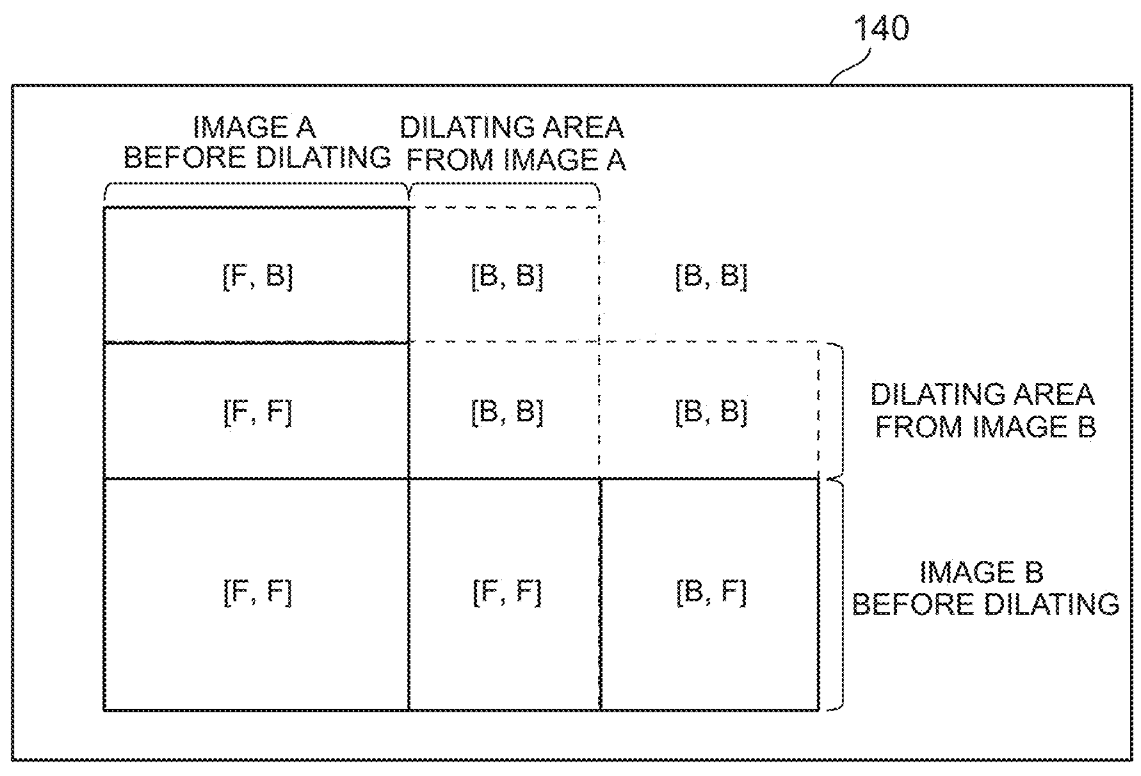
FIG. 7 It depicts an explanatory diagram for explaining deformation of the object.

FIG. 7 is an explanatory diagram for explaining deformation of the object.

The difference map generator 21 superimposes the image A after the dilating process, i.e., the first object map 112 on the image B after the dilating process, i.e., the second object map 122. FIG. 7 schematically represents a synthesized image (a difference map) 140 after superimposition.

It is assumed that the observed image that is a source of the image B has been obtained later in time than the observed image that is a source of the image A.

In FIG. 7, the area [F, B] indicates an area where the object was present in the first object map 112 but not in the second object map 122. In other words, the area [F, B] indicates an area where the object has disappeared. The area [F, F] indicates an area where the object exists in the first object map 112 and the second object map 122. In other words, the area [F, F] indicates an area where no change has occurred. The area [B, F] indicates an area where the object was not present in the first object map 112 but is present in the second object map 122. In other words, the area [B, F] indicates an area where the object newly appeared. The area [B, B] indicates an area where the object does not exist in either the first object map 112 or the second object map 122. In other words, the area [B, B] indicates an area where no change has occurred.

The difference map generator 21 generates the difference map 140 based on the concept as illustrated in FIG. 7. Specifically, the difference map generator 21 generates the difference map 140 capable of distinguishing a change area (an areas where an object has disappeared or appeared) from a non-change area.

Figure 8:
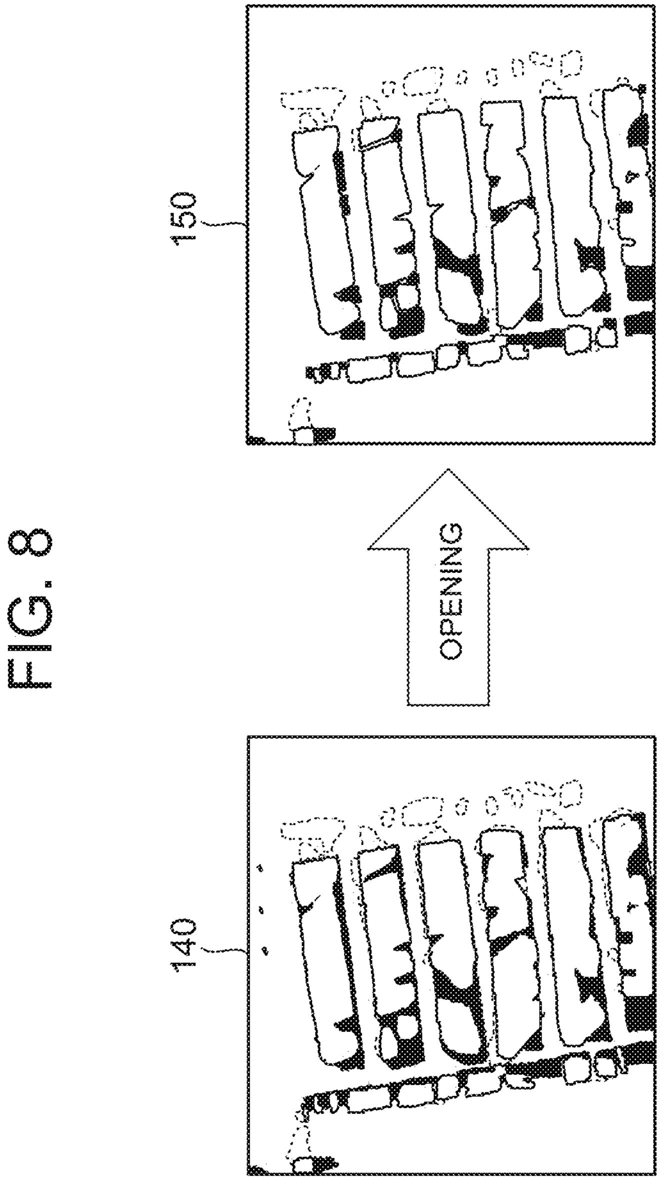
FIG. 8 It depicts an explanatory diagram for explaining a noise elimination process.

FIG. 8 is an explanatory diagram for explaining a noise elimination process.

In the difference map 140 shown in FIG. 8, the black areas correspond to the area [B, F] illustrated in FIG. 7. In other words, the black areas indicate areas where the object has disappeared. The areas surrounded by dashed lines correspond to the area [F, B] illustrated in FIG. 7. In other words, the areas surrounded by dashed lines indicate areas where the object has disappeared. The areas surrounded by solid lines correspond to the area [F, F] or the area [B, B] illustrated in FIG. 7. In other words, the areas surrounded by solid lines indicate areas where no change has occurred.

The difference map generator 21 applies a noise elimination process to the difference map 140. The noise elimination process is a process to eliminate areas that are smaller than the object as noises. In the example shown in FIG. 8, the difference map generator 21 applies an opening process to the difference map 140. The opening process is a combination of erosion and dilation. When the difference map generator 21 performs the erosion process in the opening process, the difference map generator 21 erodes the object by the number of pixels corresponding to the size of the object.

In this example embodiment, the difference map generator 21 outputs the difference map 150 in which the noise has been eliminated, but it may also output the difference map 140 before the noise elimination process is applied.

FIG. 9 is a block diagram showing a specific configuration example of the difference map generator 21. The difference map generator 21 shown in FIG. 9 includes a first collapse parameter calculator 211, a second collapse parameter calculator 212, a first dilation unit 311, a second dilation unit 312, a map generator 411 and a noise eliminator 511.

The first collapse parameter calculator 211 is provided with a range azimuth, an incidence angle and a height of the object regarding the image A (the first object map 111). The first collapse parameter calculator 211 calculates the collapse amount of the object in the image A using the incidence angle and the height of the object. The first collapse parameter calculator 211 also determines the collapsing direction of the object in the image A using the range azimuth. The collapsing direction is the same as the direction indicated by the range azimuth $\alpha_A$. The first collapse parameter calculator 211 outputs the first collapse parameter to the second dilation unit 312. The first collapse parameter includes at least data indicating a collapse amount of the object and data indicating a collapsing direction of the object.

The second collapse parameter calculator 212 is provided with a range azimuth, an incidence angle and a height of the object regarding the image B (the second object map 121). The second collapse parameter calculator 212 calculates the collapse amount of the object in the image B using the incidence angle and the height of the object. The second collapse parameter calculator 212 also determines the collapsing direction of the object in the image B using the range azimuth. The collapsing direction is the same as the direction indicated by the range azimuth $\alpha_B$. The second collapse parameter calculator 212 outputs the second collapse parameter to the first dilation unit 311. The second collapse parameter includes at least data indicating a collapse amount of the object and data indicating a collapsing direction of the object.

When an optical image is used as the observed image, the first collapse parameter calculator 21 calculates a direction indicated by the range azimuth $\alpha_A$+180 degrees (or the range azimuth $\alpha_A$−180 degrees) as the collapsing direction in the first collapse parameter. The second collapse parameter calculator 212 calculates the direction indicated by the range azimuth $\alpha_B$+180 degrees (or the range azimuth $\alpha_B$−180 degrees) as the collapsing direction in the second collapse parameter.

The image A and the second collapse parameter are input to the first dilation unit 311. The first dilation unit 311 dilates the object in the image A using the second collapse parameter to generate an image A (a first object map 112) in which the object is dilated. The first dilation unit 311 outputs the first object map 112 to the map generator 411.

The image B and the first collapse parameter are input to the second dilation unit 312. The second dilation unit 312 dilates the object in the image B using the first collapse parameter to generate an image B (a second object map 122) in which the object is dilated. The second dilation unit 312 outputs the second object map 122 to the map generator 411.

The map generator 411 superimposes the first object map 112 on the second object map 122. In other words, the map generator 411 synthesizes the first object map 112 and the second object map 122. Then, the map generator 411 determines a difference (disappearance or appearance) between the object in the first object map 112 and the corresponding object in the second object map 122 to the object in the first object map 112. The map generator 411 modifies the synthesized image, in which the first object map 112 is superimposed on the second object map 122, to an image capable of distinguishing a change area from a non-change area, and outputs the image as the difference map 140 to the noise eliminator 511.

The noise eliminator 511 applies an opening process to the difference map 140 and outputs an image in which noises are eliminated as the difference map.

Figure 10:
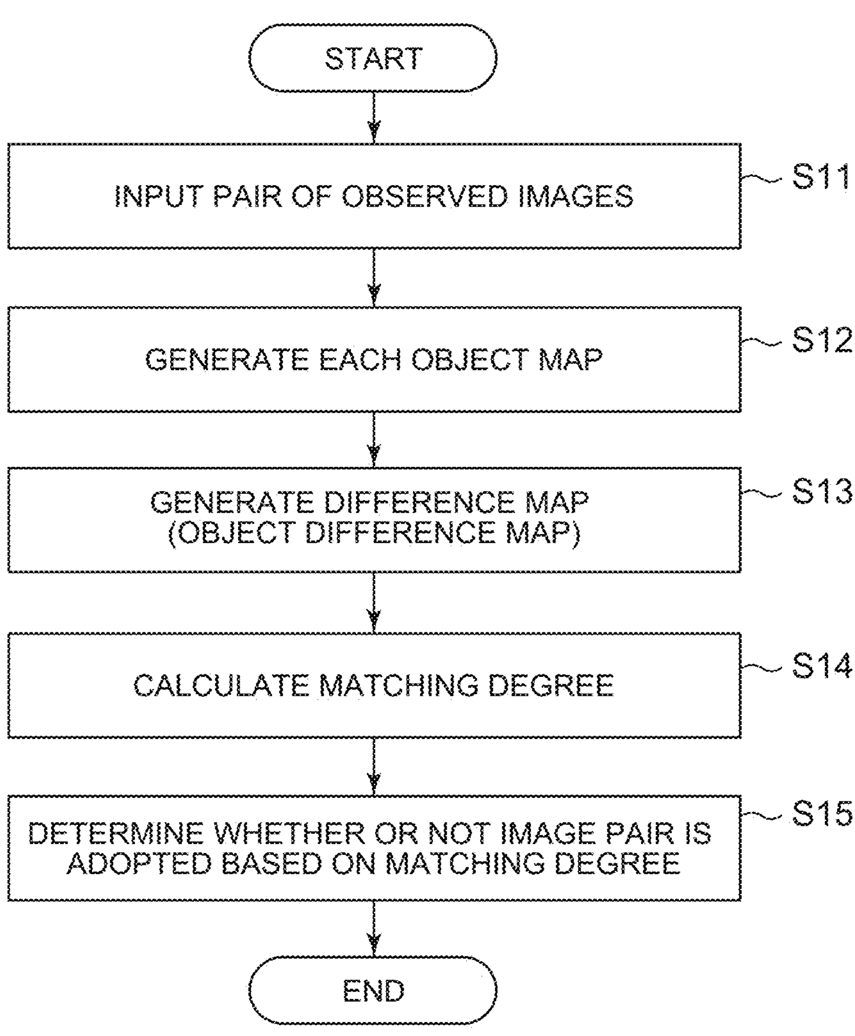
FIG. 10 It depicts a flowchart showing an operation of the image processing device of the first example embodiment.

Next, the operation of the image processing device is explained with reference to the flowchart in FIG. 10.

The image processing device 1 inputs a pair of observed images (step S11). In the image processing device 1, the object map generator 10 generates a pair of object maps from each of the observed images (step S12). The difference map generator 21 in the image pair determination unit 20A generates a difference map from the pair of object maps (step S13).

Figure 11:
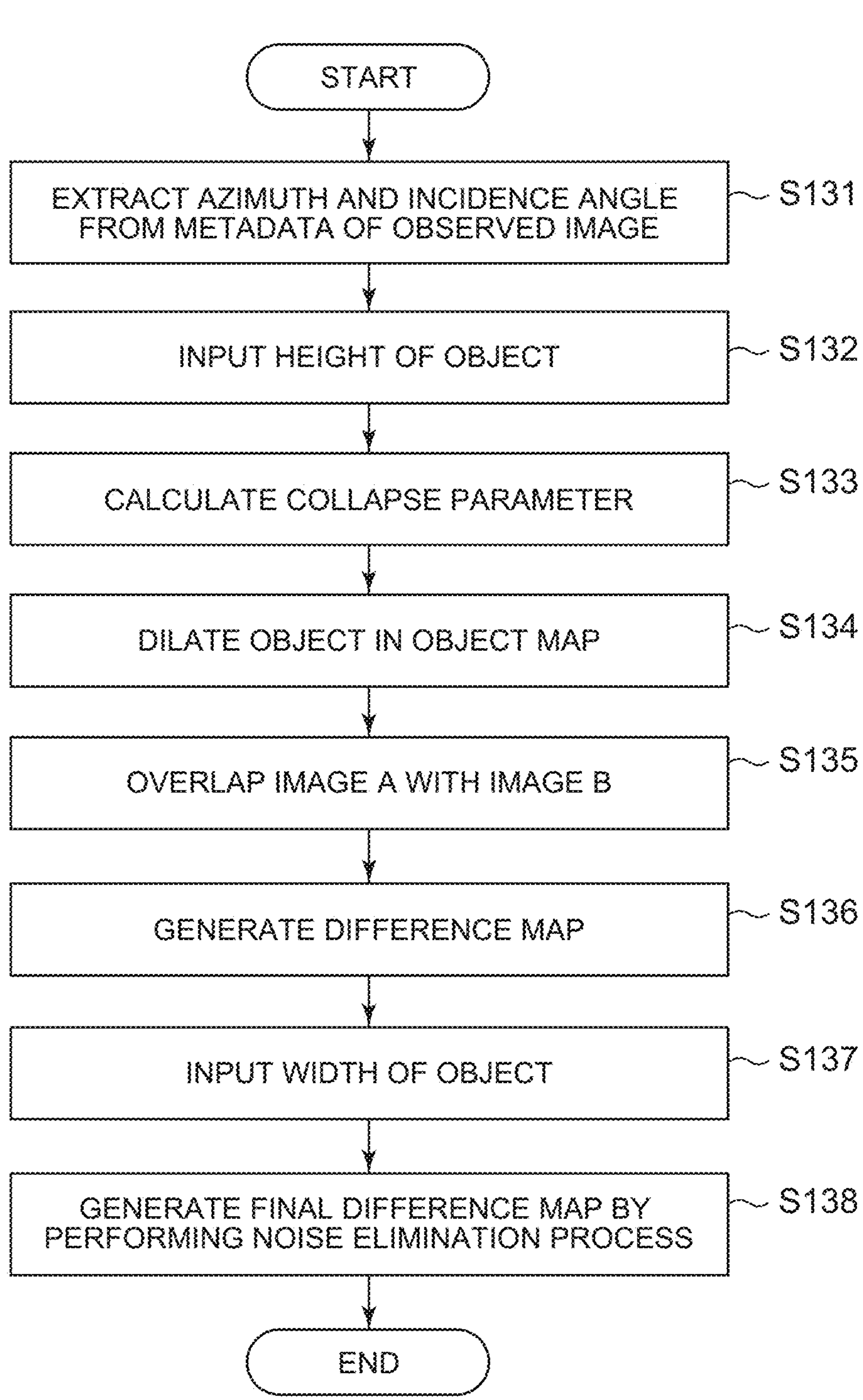
FIG. 11 It depicts a flowchart showing an operation of the difference map generator in the first example embodiment.

FIG. 11 is a flowchart showing the operation of the difference map generator 21, i.e., the process of step S13.

A pair of object maps is input to the difference map generator 21. The pair of object maps corresponds to the first object map 111 and the second object map 121 shown in FIG. 6.

Meta-information of one observed image is input to the first collapse parameter calculator 211. Meta-information of the other observed image is input to the second collapsed parameter calculator 212. In general, an available observed image is accompanied by meta-information (metadata) such as the time of shooting, the shooting location (for example, latitude and longitude of the center of the observed image), and the direction of electromagnetic radiation (observation direction), etc. The first collapse parameter calculator 211 extracts the range azimuth $\alpha_A$ and the incidence angle $\theta_A$ from the meta-information of one observed image, and the second collapse parameter calculator 212 extracts the range azimuth $\alpha_B$ and the incidence angle $\theta_B$ from the meta-information of the other observed image (step S131).

It is not essential that the first collapse parameter calculator 211 and the second collapse parameter calculator 212 extract a range azimuth and an incidence angle from the meta-information. For example, means other than the first collapse parameter calculator 211 and the second collapse parameter calculator 212 may extract a range azimuth and an incidence angle from the meta-information. In such a case, the means provides the extracted range azimuth and the extracted incidence angle to the first collapse parameter calculator 211 and the second collapse parameter calculator 212.

Data indicating the height h of the object is input to the first collapse parameter calculator 211 and the second collapse parameter calculator 212 (step S132).

The height h of the object is set in advance. For example, when the object is an automobile, a value of the height of an ordinary automobile or a value with a margin to it is input to the difference map generator 21 as the height h of the object.

The first collapse parameter calculator 211 and the second collapse parameter calculator 212 calculate the collapse parameters (step S133). In step S133, the first collapse parameter calculator 211 calculates the collapse amount $l_A$ of the object in the image A by the above equation (1) using the incidence angle $\theta_A$ obtained in the process of step S131 and the height h of the object. The first collapse parameter calculator 211 regards the range azimuth $\alpha_A$ obtained in the process of step S131 as the collapsing direction of the object. The first collapse parameter calculator 211 regards the obtained collapse amount and the collapsing direction as the first collapse parameter. When there are multiple objects in the image A, the first collapse parameter calculator 211 determines the collapse amount and collapsing direction of each object, and includes each collapse amount and each collapsing direction in the first collapse parameter.

In step S133, the second collapse parameter calculator 212 calculates the collapse amount $l_B$ of the object in the image B by the above equation (1) using the incidence angle $\theta_B$ obtained in the process of step S131 and the height h of the object. The second collapse parameter calculator 212 regards the range azimuth $\alpha_B$ obtained in the process of step S131 as the collapsing direction of the object. The second collapse parameter calculator 212 regards the obtained collapse amount and the collapsing direction as the second collapse parameter. When there are multiple objects in the image B, the second collapse parameter calculator 212 determines the collapse amount and collapsing direction of each object, and includes each collapse amount and each collapsing direction in the second collapse parameter.

When an optical image is used as the observed image, the first collapse parameter calculator 211 determines a direction which is different from the range azimuth $\alpha_A$ by 180 degrees as the collapsing direction in the first collapse parameter. The second collapse parameter calculator 212 determines a direction which is different from the range azimuth $\alpha_B$ by 180 degrees as the collapsing direction in the second collapse parameter.

The first dilation unit 311 and the second dilation unit 312 dilate the object in the object map (image A or image B) (step S134). In step S134, the first dilation unit 311 dilates the object in the image A in the collapsing direction included in the second collapse parameter by the collapse amount $l_B$. The second dilation unit 312 dilates the object in the image B in the collapsed direction included in the first collapsed parameter by the collapsed amount $l_A$.

The difference map generation unit 411 superimposes the image A (the first object map 112: refer to FIG. 6A) on the image B (the second object map 122: refer to FIG. 6B) in which the object is dilated (step S135).

The map generator 411 determines whether the object has changed or not based on the multiplicity of the object in the synthesized image generated in the process of step S135. For example, the map generator 411 compares the first object map 112 and the second object map 122 pixel by pixel (every pixel) to determine whether the object has changed or not. Then, as illustrated in FIG. 7, the difference map generation means 41 determines that the object that was present in the image A but is not present in the image B is the object that has disappeared (changed object). The map generator 411 also determines that the object that was not present in the image A but is present in the image B is a newly appeared object (changed object). The map generator 411 determines other objects as unchanged objects.

The map generator 411 generates a difference map 140 (refer to FIG. 8) by reflecting the determination result as to whether the image has changed or not in the superimposed image generated in the process of step S135 (step S136).

Data indicating the width of the object is input to the noise eliminator 511 (step S137). The width of the object is set in advance. For example, when the object is an automobile, the value of the width of an ordinary automobile or a value with a margin to it is input to the noise eliminator 511 as the width of the object. It should be noted that the process of step S137 does not have to be performed at the timing shown in FIG. 11. That is, the width of the object need only be input before the execution of the process of step S138 is started.

The noise eliminator 511 applies an opening process to the difference map 140 and outputs it as a difference map (final difference map) 150 from which noise has been eliminated (step S138). In the process of step S138, the noise eliminator 511 erodes the object by the number of pixels corresponding to the size (specifically, the width) of the object in the erosion process in the opening process. The number of pixels to be eroded is determined in advance according to the size of the object. Therefore, it is set to the number of pixels that can be eliminated from the collection of pixels that should be determined not to be the object. As an example, when the maximum width of the object is 3 pixels, the noise eliminator 511 performs the erosion process two times so that blocks with a size of less than 3 pixels, i.e., equal to or less than 2 pixels will be eliminated.

The matching degree calculator 22 calculates a matching degree between image A and image B based on the difference map 150 generated by the difference map generator 21 (step S14). In the process of step S14, the matching degree calculator 22 calculates, for example, the percentage of the number of pixels in the non-change area (in the example shown in FIG. 3, the ellipse area surrounded by a solid line) to the total number of pixels in the difference map 150 as the matching degree. In other words, the matching degree calculator 22 calculates the ratio of the size of the non-change areas where the object has not changed to the total area of the image B as the matching degree.

The matching degree determination unit 23 determines whether or not the image pair (image A and image B) is an object-matching image pair based on the matching degree calculated by the matching degree calculator 22 (step S15). For example, the matching degree determination unit 23 determines that the image pair is an object-matching image pair when the matching degree exceeds a predetermined value. Then, the matching degree determination unit 23 outputs the object-matching image pair.

As explained above, the image processing device of this example embodiment determines the matching degree (similarity) of an image pair by considering the state of the object in the observed image (appearance of the object or disappearance of the object). The image processing device then adopts the image pair with the highest matching degree as the object-matching image pair. As a result, the image processing device can collect a large number of images of the same area, which increases the reliability of analysis of ground surface displacement, etc.

Example Embodiment 2

Figure 12:
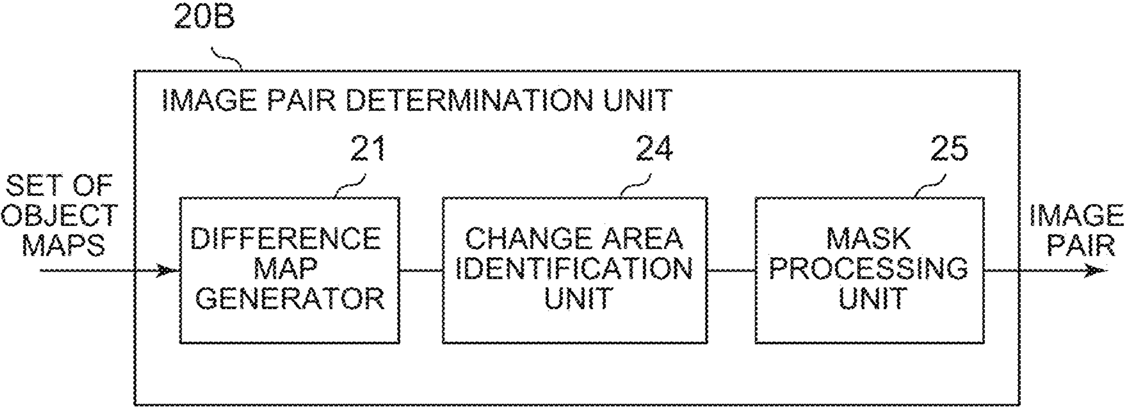
FIG. 12 It depicts a block diagram showing a configuration example of the image pair determination unit in the image processing device of the second example embodiment.

FIG. 12 is a block diagram showing a configuration example of the image pair determination unit in the image processing device of the second example embodiment. The configuration of the image processing device of the second example embodiment is as shown in FIG. 1. The image pair determination unit 20B shown in FIG. 12 includes a difference map generator 21, a change area identification unit 24, and a mask processing unit 25. The image pair determination unit 20B shown in FIG. 12 corresponds to the image pair determination unit 20 shown in FIG. 1.

The difference map generator 21 performs the same process as in the first example embodiment. The change area identification unit 24 identifies a change area or areas (an area or areas where objects have disappeared or appeared) in a pair of object maps, i.e., an image pair (image A and image B), using the difference map generated by the difference map generator 21. The mask processing unit 25 applies mask processing to the change areas in the image A and the image B.

FIG. 13 is an explanatory diagram for explaining mask processing. An example of image A (first object map 111) obtained from the first observed image is shown on the left side of the upper row of FIG. 13. Three automobiles 91, 92, 93 are present in the image A. On the left side of the lower row of FIG. 13, an example of image B (second object map 121) obtained from the second observed image is shown. Two automobiles 93, 94 are present in the image B. The time when the first observed image was obtained is time t1. The time when the second observed image was obtained is time t2. At the time t2, the automobiles 91, 92, which were present at time t1, have disappeared. In addition, a new automobile 94 appears at time t2.

In this example, the first object map 111 and the second object map 121 correspond to images of the parking lot 120.

In the image A, the change area is an area that includes the area where automobiles 91, 92 are present. In the image B, the change area is the area that includes the area in which the automobile 94 exists. Then, as in the first example embodiment, a difference map is generated using the image A and the image B. Referring to the difference map 150 in FIG. 3, in the difference map 150, the ellipse surrounded by a solid line indicates an area where the automobile 93 that has not changed from the time t1 to the time t2 exists. In other words, it indicates an area where there is no change. The black ellipse indicates an area where the newly appeared automobile 94 exists. The ellipses surrounded by dashed lines indicate areas where the disappeared automobiles 91, 92 existed. In other words, the black ellipse and the ellipse surrounded by a dashed line indicate a change area.

In this example embodiment, mask processing is applied to the area where the automobiles 91, 92 exist in the image A. In the image B, mask processing is applied to the area where the automobile 94 exists. As shown in FIG. 13, the mask processing on the image A forms a mask area M1 in the image A (image 113) where the mask processing is applied. The mask processing on the image B forms a mask area M2 in the image B (image 123) where the mask processing is applied.

Figure 14:
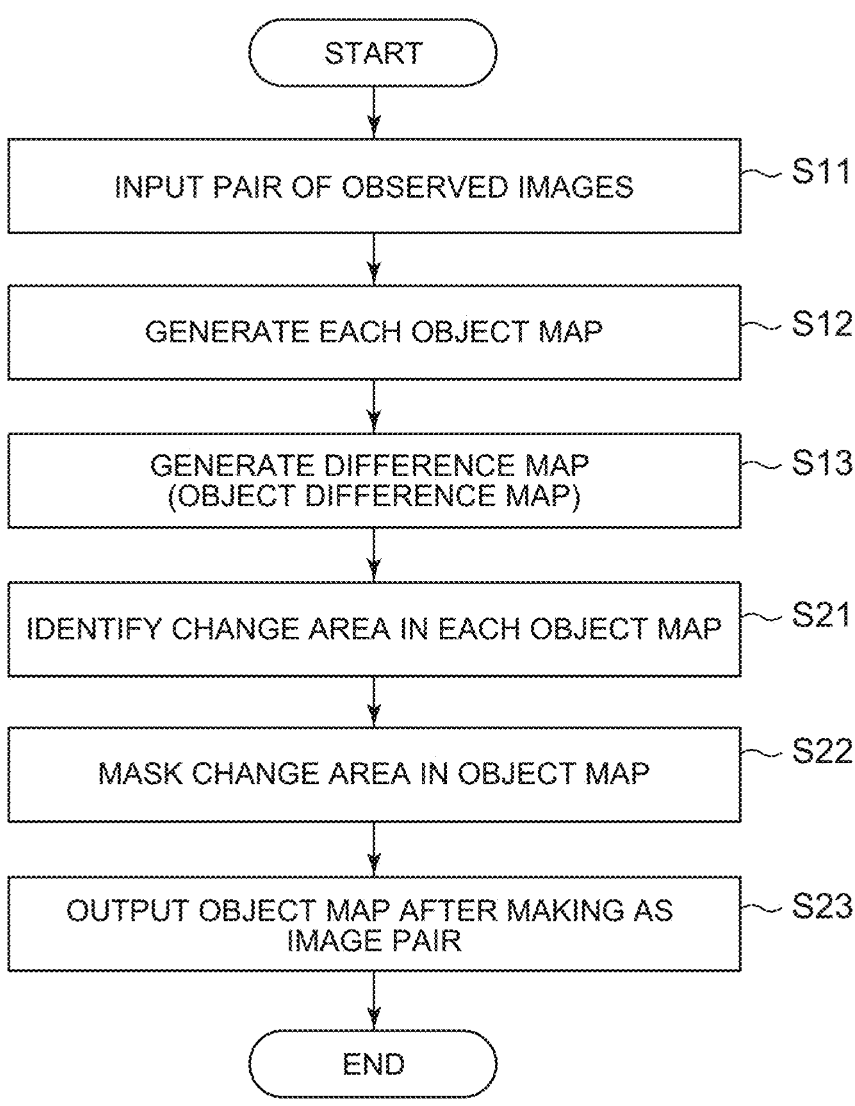
FIG. 14 It depicts a flowchart showing an operation of the image processing device of the second example embodiment.

Next, the operation of the image processing device of the second example embodiment is explained with reference to the flowchart in FIG. 14.

The image processing device 1 inputs a pair of observed images (step S11). In the image processing unit 1, the object map generator 10 generates a pair of object maps from each of the observed images, as in the first example embodiment (step S12). The difference map generator 21 in the image pair determination unit 20B generates a difference map from the pair of object maps, as in the first example embodiment (step S13).

The change area identification unit 24 in the image pair determination unit 20B identifies a change areas or areas (an area or areas where objects have disappeared or appeared) in the image pair (image A and image B) by referring to the difference map generated by the difference map generator 21 (step S21). The mask processing unit 25 applies mask processing to the change area in the image A and the image B (step S22).

The mask processing unit 25 replaces the values of all pixels in the change areas in the images A and B with predetermined default values, for example, in the process of step S22. The areas where the values have been replaced are mask areas M1 and M2 in FIG. 13.

The mask processing unit 25 may replace the pixels of the change areas in the images A and B with the pixels of the background image in the object map obtained in advance. The mask processing unit 25 may use, for the image A, the background image corresponding to the orbit from which the observed image on which the image A is based was obtained, and for the image B, the background image corresponding to the orbit from which the observed image on which the image B is based was obtained. In other words, the mask processing unit 25 may use different background images depending on the orbit. In that case, the mask processing unit 25 may use the minimum value in multiple background images for each pixel, when the multiple background images have been obtained for each orbit.

The observed image on which the mage A is based is the observed image in which the image A appears. The observed image which is the basis of the image B is the observed image in which the image B appears.

The mask processing unit 25 in the image pair determination unit 20B outputs the mask-processed image A and image B as an object-matching image pair (step S23).

The image processing device of this example embodiment performs mask processing so that the matching degree between image pairs becomes higher by taking into account the state of the object (appearance of the object or disappearance of the object) in the observed image. The mask-processed area is neither a change area nor a non-change area. Therefore, the mask processing makes the change area of one image relatively smaller than the non-change area where the object has not changed. Then, the image processing device adopts the image pair to which mask processing has been applied as the object-matching image pair. As a result, the image processing device can collect many images of the same area.

Example Embodiment 3

Figure 15:
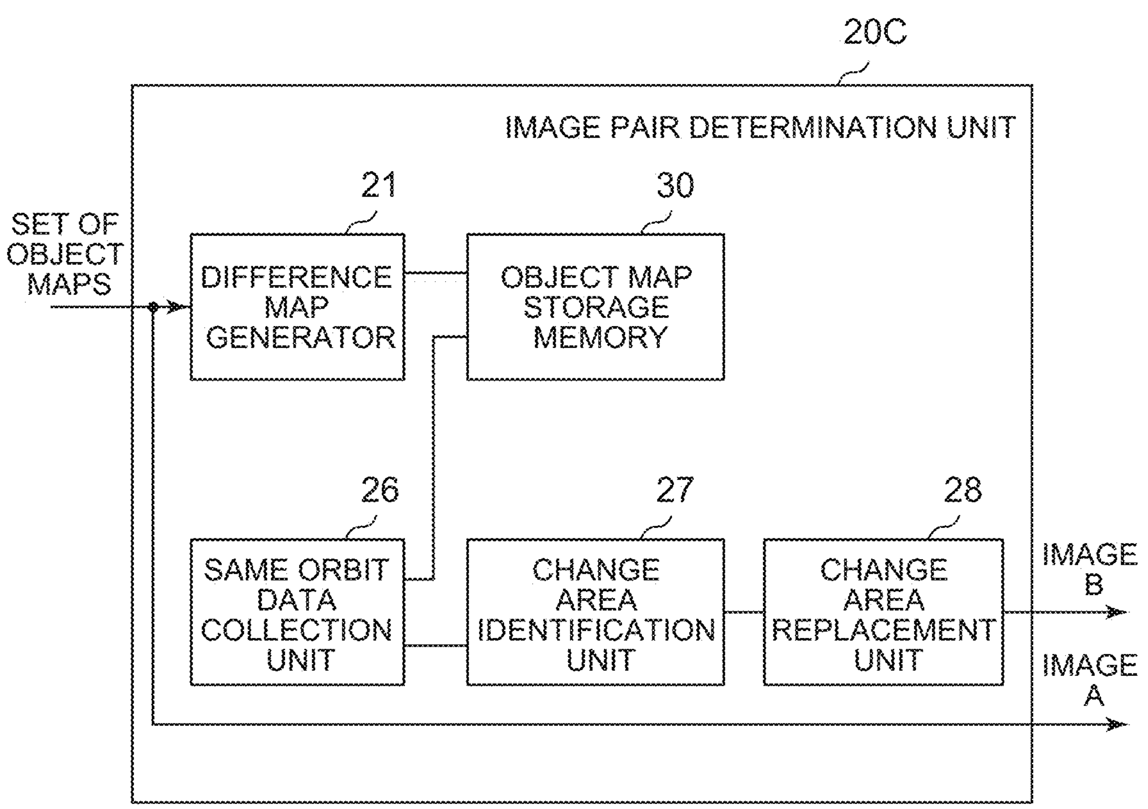
FIG. 15 It depicts a block diagram showing a configuration example of the image pair determination unit in the image processing device of the third example embodiment.

FIG. 15 is a block diagram showing a configuration example of the image pair determination unit in the image processing device of the third example embodiment. The configuration of the image processing device of the third example embodiment is as shown in FIG. 1. The image pair determination unit 20C shown in FIG. 15 includes a difference map generator 21, a same orbit data collection unit 26, a change area identification unit 27, a change area replacement unit 28, and an object map storage memory 30. The image pair determination unit 20C shown in FIG. 15 corresponds to the image pair determination unit 20 shown in FIG. 1.

The difference map generator 21 performs the same process as in the first example embodiment. However, in this example embodiment, the difference map generator 21 generates many difference maps, as described below. The many difference maps are stored in the object map storage memory 30. Specifically, a pair of object maps and a difference map generated from the pair are temporarily stored in the object map storage memory 30 in correspondence.

The object map storage memory 30 stores a plurality of pairs consisting of image A and each of a plurality of other images, for example. The object map storage memory 30 also stores a difference map generated from image A and each of the other plurality of images.

The same orbit data collection unit 26 extracts from the object map storage memory 30, each of a plurality of object maps (set as image B') obtained from observed images taken at the same orbit (set as orbit B') and each object map corresponding the image B'. The difference map corresponding to image B' is, strictly speaking, a difference map generated from the pair including image B' (in this example embodiment, image A and image B').

The change area identification unit 27 identifies a non-change area in the image B' extracted from the object map storage memory 30 using the difference map corresponding to the image B'.

The change area replacement unit 28 generates image B (second object map 121) by combining the non-change areas in the multiple images B'.

Figure 16:
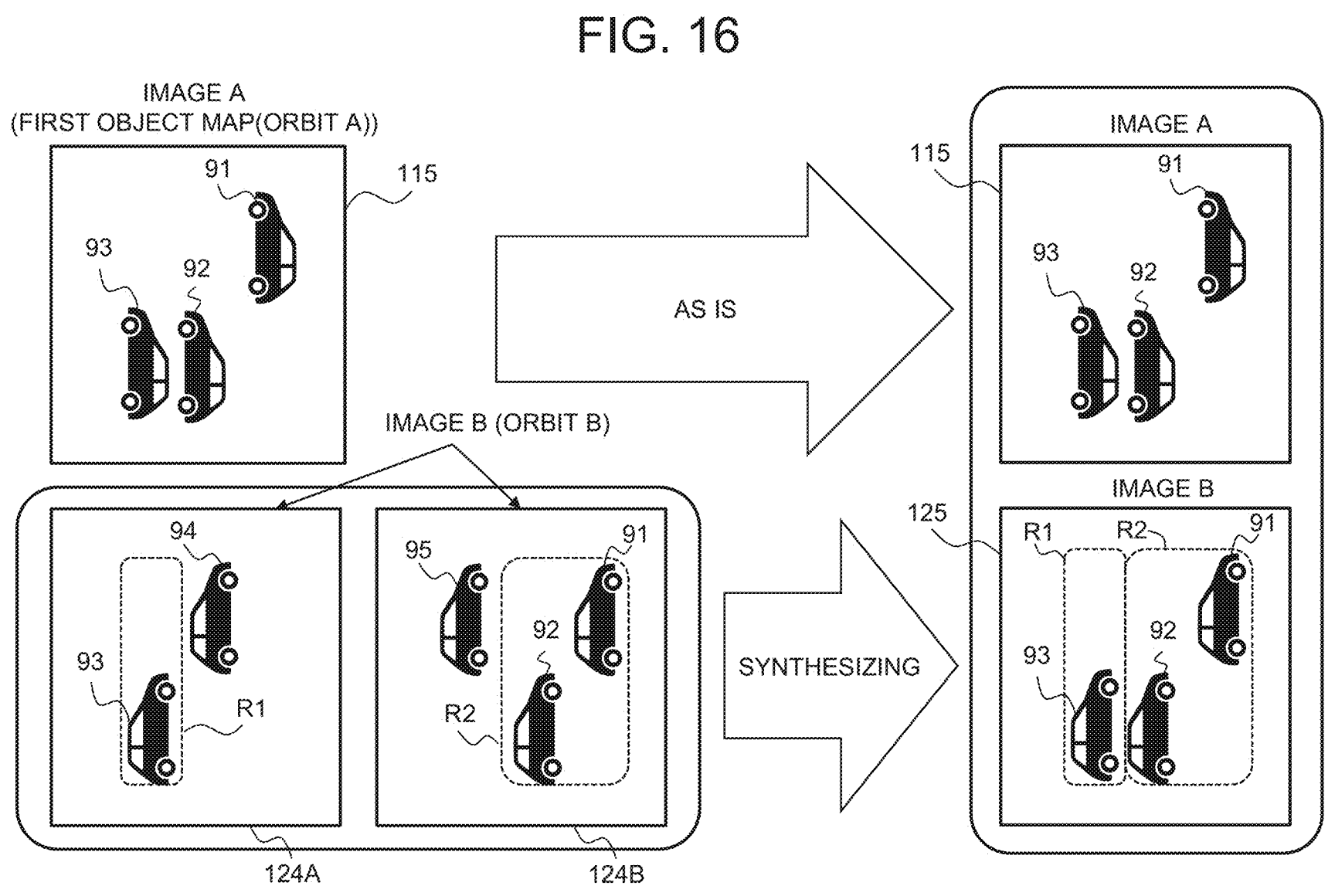

FIG. 16 is an explanatory diagram for explaining how one image in an image pair is generated. On the left side of the upper row of FIG. 16, an example of the image A (first object map 115) generated by the object map generator 10 is shown. Three automobiles 91, 92, 93 are present in the image A. On the left side of the lower row of FIG. 16, an example of the image B' (object maps 124A, 124B) for generating the desired image B (second object map 125) is shown. Two images B' are illustrated in FIG. 16.

In the example shown in FIG. 16, two automobiles 93, 94 are present in the image B' (object map 124A). Compared to the image A, the automobile 94 in the image B' (object map 124A) is a newly appeared automobile. In addition, in the image B' (object map 124A), the automobile 92 has disappeared. Therefore, in the image B' (object map 124A), the area where the automobile 94 exists and the area where the automobile 92 disappears are change areas. The automobile 93 is also present in the image A. That is, in the image B' (object map 124A), the area including automobile 93 is a non-change area R1.

Three automobiles 91, 92, 95 are present in the image B' (object map 124B). Compared to the image A, automobile 95 in the image B' (object map 124B) is a newly appeared automobile. Therefore, the area where the automobile 95 exists in the image B' (object map 124B) is a change area. The automobiles 91, 92 also exist in the image A. That is, in the image B' (object map 124B), the area including automobiles 91, 92 is a non-change area R2.

The non-change area R1 in the image B' (object map 124A) and the non-change area R2 in the image B' (object map 124B) are combined. Specifically, one image (for example, object map 124A) is selected from the multiple images B' input from the object map storage memory 30, and the change area in the selected image is replaced by the non-change area (for example, non-change area R2) in the other image (for example, object map 124B) is replaced. The non-change area R1 in one image (for example, object map 124A) is used as is. The change area and the non-change area in each image B' are identified by the difference map corresponding to the image B'.

Figure 17:
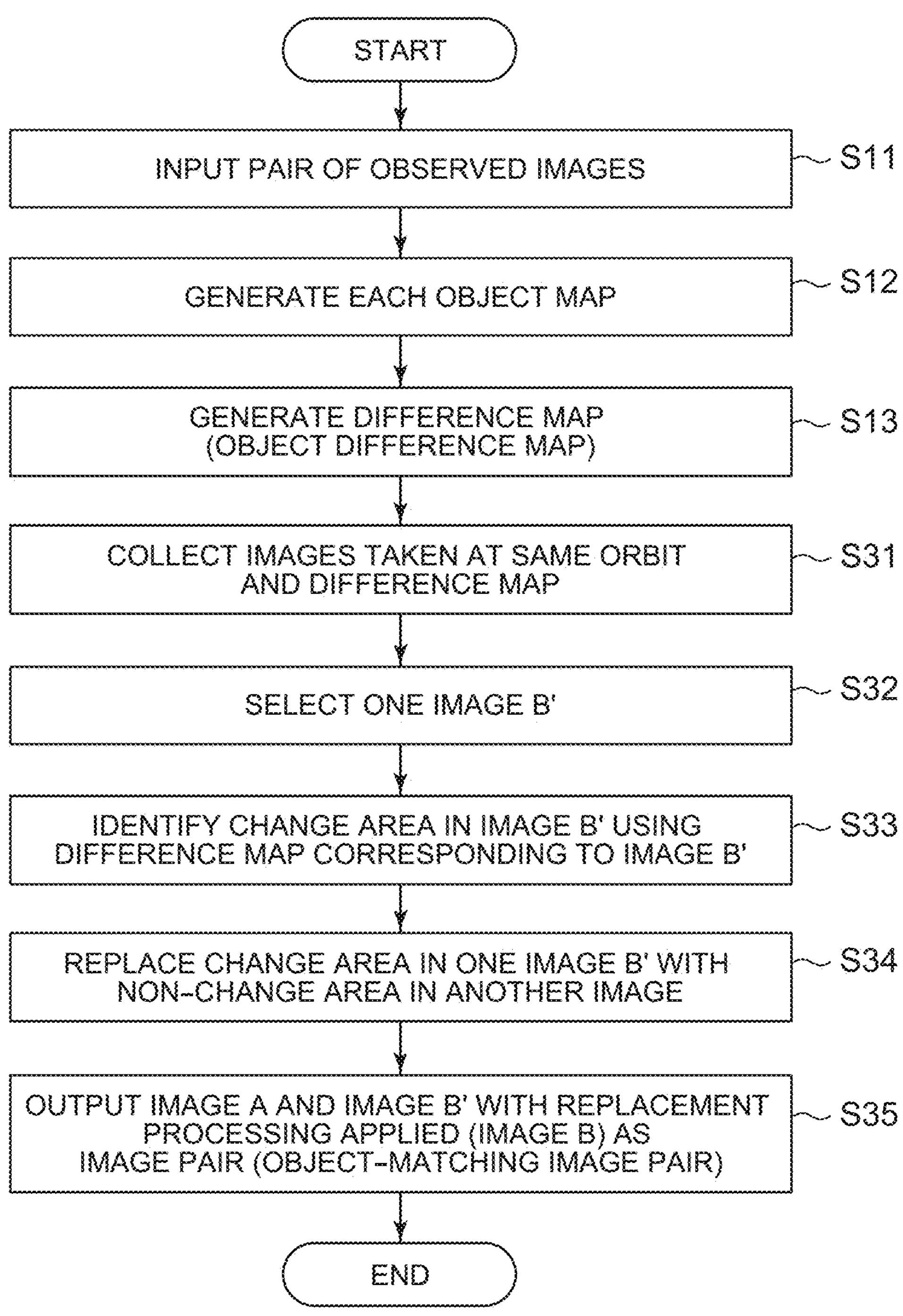
FIG. 17 It depicts a flowchart showing an operation of the image processing device of the third example embodiment.

Next, the operation of the image processing device of the third example embodiment is explained with reference to the flowchart in FIG. 17.

The image processing device 1 inputs a pair of observed images (step S11). In the image processing unit 1, the object map generator 10 generates a pair of object maps from each of the observed images, as in the first example embodiment (step S12). The difference map generator 21 in the image pair determination unit 20C generates a difference map from the pair of object maps, as in the first example embodiment (step S13). However, in this example embodiment, the difference map generator 21 generates a plurality of pairs consisting of the image A and each of a plurality of other images, for example. The difference map generator 21 stores the difference map generated from the image A and each of the other plurality of images and each of the other plurality of images in the object map storage memory 30.

The same orbit data collection unit 26 extracts (collects) from the object map storage memory 30 a plurality of images B', each of which is paired with the image A, and a difference map corresponding to the image A and the image B' (the difference map generated from the image A and the image B') (step S31). Referring to the example shown in FIG. 16, the same orbit data collection unit 26 extracts the object map 124A and the object map 124B, as well as the difference map generated from the image A and the object map 124A, and the difference map generated from the image A and the object map 124B.

The plurality of images B' that are paired with the image A are images in the same area as the shooting area of the image A, and the orbit from which the underlying observed image was obtained is the same (different from the orbit for the image A). The image B' is an image of the same area as the image A, and the orbit from which the underlying observed image was obtained is the same (different from that for the image A).

The change area identification unit 27 selects one of the plurality of images B' extracted in the process of step S31 (step S32). In the example shown in FIG. 16, the object map 124A is selected. Hereinafter, the selected image B' is referred to as the object map 124A. Further, the change area identification unit 27 identifies a change area (in the example shown in FIG. 16, an area other than the non-change area R1) in the object map 124A using the difference map corresponding to the selected object map 124A (step S33).

The change area replacement unit 28 examines non-change areas in each of the plurality of images B' other than the selected object map 124A. Specifically, the change area replacement unit 28 identifies the image B' that includes a non-change area that can effectively replace the change area in the object map 124A. An image including a non-variable area that can effectively replace the change area is, for example, an image having a non-variable area that can replace the widest area in the change area with a non-variable area. In other words, based on the number of pixels in the change area in the object map 124A, the image is an image with the largest number of pixels of the non-change area.

The change area replacement unit 28 replaces the change area in the object map 124A with the non-change area in the identified image B' (step S34). The image B' with such a substitution process is the desired image B.

The change area replacement unit 28 in the image pair determination unit 20C outputs the image A and the image B as an object-matching image pair (step S35).

The image processing device of this example embodiment replaces change areas in one image into non-change areas by using non-change areas in other images obtained by observing the same observed area as in the one image. Therefore, the number of pixels in the non-change area in the first image is increased. In other words, the change area of one image becomes smaller relative to the non-change area where the object has not changed. Then, the image processing device uses the image with the increased number of pixels in the non-change area as one of the images in the object-matching image pair. As a result, the image processing device can collect a large number of images of the same area, which increases the reliability of the analysis of ground surface displacement, etc.

Figure 18:
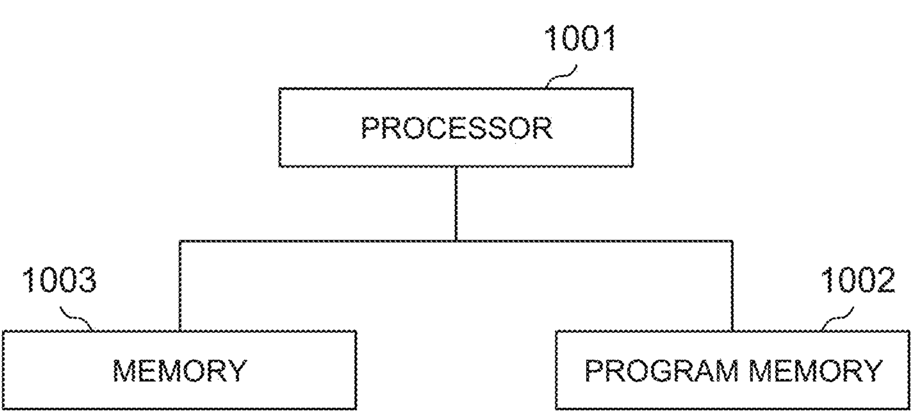
FIG. 18 It depicts a block diagram showing an exemplary configuration of an information processing device capable of implementing the functions of the image processing device.

FIG. 18 is a block diagram showing an exemplary configuration of an information processing device capable of implementing the functions of the image processing device of the above example embodiment. The information processing device shown in FIG. 18 includes one or more processors such as one or more CPUs (Central Processing Unit), a program memory 1002 and a memory 1003. FIG. 18 illustrates an information processing device having one processor 1001.

The program memory 1002 is, for example, a non-transitory computer readable medium. The non-transitory computer readable medium is one of various types of tangible storage media. For example, as the program memory 1002, a semiconductor storage medium such as a flash ROM (Read Only Memory) or a magnetic storage medium such as a hard disk can be used. In the program memory 1002, an image processing program for realizing functions of blocks (the object map generator 10, the image pair determination units 20, 20A, 20B, 20C) in the image processing device of the above example embodiment is stored.

The processor 1001 realizes the function of the image processing device by executing processing according to the image processing program stored in the program memory 1002. When multiple processors are implemented, they can also work together to realize the function of the image processing device.

For example, a RAM (Random Access Memory) can be used as the memory 1003. In the memory 1003, temporary data that is generated when the image processing device executes processing, etc. are stored. It can be assumed that an image processing program is transferred to the memory 1003 and the processor 1001 executes processing based on the image processing program in the memory 1003. The program memory 1002 and the memory 1003 may be integrated into a single unit.

Figure 19:
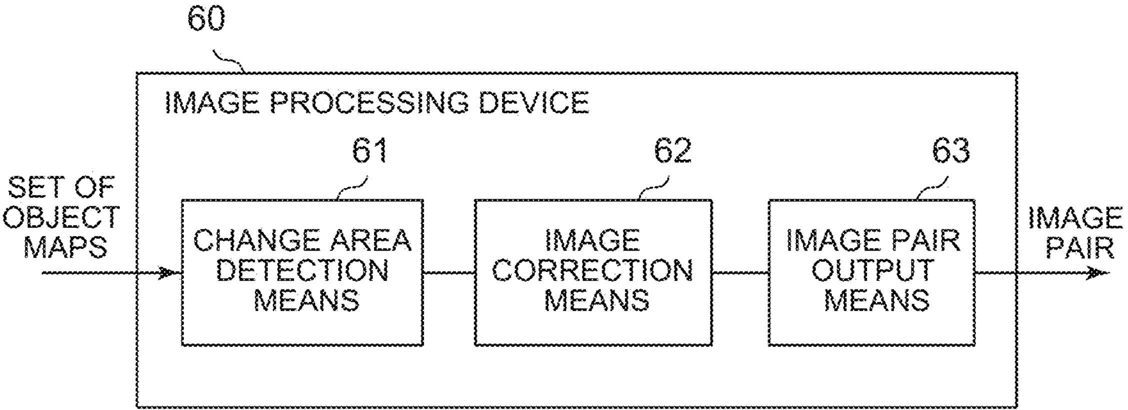
FIG. 19 It depicts a block diagram showing the main part of the image processing device.

FIG. 19 is a block diagram showing the main part of the image processing device. The image processing device 60 shown in FIG. 19 comprises change area detection means 61 (change area detection: in the second and third example embodiments, realized by the difference map generator 21) for detecting a change area, where an object has changed compared to the first image (for example, the image A), in the second image (for example, the image B) obtained by observing the same observed area as an observed area in the first image, image correction means 62 (image correction unit: in the second example embodiment, realized by the mask processing unit 25, in the third example embodiment, realized by the change area replacement unit 28) for performing a correction process to make the change area in the second image smaller relative to a non-change area where the object has not changed, and image pair output means 63 (image pair output unit: in the second example embodiment, realized by the mask processing unit 25, in the third example embodiment, realized by the image pair determination unit 20C and the change area replacement unit 28 in the image pair determination unit 20C) for outputting an image pair of the second image processed by the image correction means and the first image.

Figure 20:
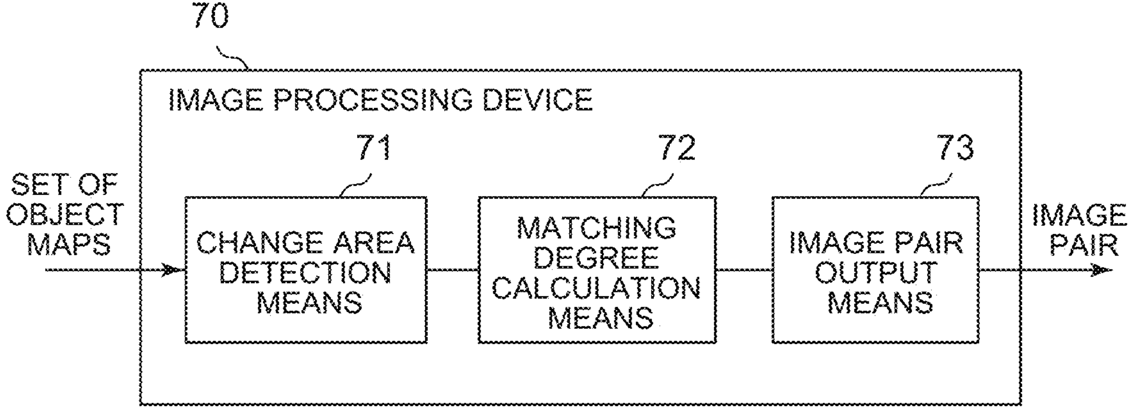
FIG. 20 It depicts a block diagram showing the main part of another image processing device.

FIG. 20 is a block diagram showing the main part of another image processing device. The image processing device 70 shown in FIG. 20 comprises change area detection means 71 (change area detection: in the first example embodiment, realized by the difference map generator 21) for detecting a change area, where an object has changed compared to the first image (for example, the image A), in the second image (for example, the image B) obtained by observing the same observed area as an observed area in the first image, matching degree calculation means 72 (matching degree calculation: in the first example embodiment, realized by the matching degree calculator 22) for calculating a matching degree between the first image and the second image based on the size of the non-change area in the second image where the object has not changed, and image pair output means 73 (image pair output unit: in the first example embodiment, realized by the matching degree determination unit 23) for outputting an image pair of the second image and the first image when the matching degree exceeds a predetermined value.

A part of or all of the above example embodiments may also be described as, but not limited to, the following supplementary notes.

(Supplementary note 1) An image processing device comprising:

change area detection means for detecting a change area, where an object has changed compared to the first image, in the second image obtained by observing the same observed area as an observed area in the first image;

image correction means for performing a correction process to make the change area in the second image smaller relative to a non-change area where the object has not changed; and image pair output means for outputting an image pair of the second image processed by the image correction means and the first image.

(Supplementary note 2) The image processing device according to Supplementary note 1, wherein the image correction means replaces pixel values of the change area in the second image with default values.

(Supplementary note 3) The image processing device according to Supplementary note 1, wherein the image correction means replaces the change area in the second image with a non-change area in another image obtained by observing the same observed area as the observed area in the first image.

(Supplementary note 4) An image processing device comprising:

change area detection means for detecting a change area, where an object has changed compared to the first image, in the second image obtained by observing the same observed area as an observed area in the first image;

matching degree calculation means for calculating a matching degree between the first image and the second image based on the size of the non-change area in the second image where the object has not changed; and image pair output means for outputting an image pair of the second image and the first image when the matching degree exceeds a predetermined value.

(Supplementary note 5) The image processing device according to Supplementary note 4, wherein the matching degree calculation means calculates a percentage of the number of pixels in the non-change area to the number of pixels in a total area in the second image as the matching degree.

(Supplementary note 6) The image processing device according to any one of Supplementary notes 1 to 5, wherein the change area detection means includes image deformation means (in the example embodiments, realized by the first dilation unit 311 and the second dilation unit 312) for generating two deformed images (for example, the first object map 112 and the second object map 122) by deforming object presence areas in the two object presence images (for example, the first object map 111 and the second object map 121), which are images obtained from each of the two observed images and in which one or more objects are present, based on an observation angle (for example, range azimuth angle and incidence angle) of each of the two observed images and a size of the object (for example, height of the object) that appears in each of the two observed images, and image generation means (in the example embodiments, realized by the map generator 411) for generating a synthesized image by combining the two deformed images, determining a change of the object between the two object presence images using the synthesized image, and generating an image (for example, the difference map 140) capable of identifying the determined change.

(Supplementary note 7) An image processing method comprising:

detecting a change area, where an object has changed compared to the first image, in the second image obtained by observing the same observed area as an observed area in the first image;

performing a correction process to make the change area in the second image smaller relative to a non-change area where the object has not changed; and outputting an image pair of the corrected processed second image and the first image.

(Supplementary note 8) The image processing method according to Supplementary note 7, wherein in the correction process, pixel values of the change area in the second image are replaced with default values.

(Supplementary note 9) The image processing method according to Supplementary note 7, wherein in the correction process, the change area in the second image is replaced with a non-change area in another image obtained by observing the same observed area as the observed area in the first image.

(Supplementary note 10) An image processing method comprising:

detecting a change area, where an object has changed compared to the first image, in the second image obtained by observing the same observed area as an observed area in the first image;

calculating a matching degree between the first image and the second image based on the size of the non-change area in the second image where the object has not changed; and outputting an image pair of the second image and the first image when the matching degree exceeds a predetermined value.

(Supplementary note 11) The image processing method according to Supplementary note 10, wherein a percentage of the number of pixels in the non-change area to the number of pixels in a total area in the second image is calculated as the matching degree.

(Supplementary note 12) The image processing method according to any one of Supplementary notes 7 to 11, further comprising when detecting the change area, generating two deformed images by deforming object presence areas in the two object presence images, which are images obtained from each of the two observed images and in which one or more objects are present, based on an observation angle of each of the two observed images and a size of the object that appears in each of the two observed images, and generating a synthesized image by combining the two deformed images, determining a change of the object between the two object presence images using the synthesized image, and generating an image capable of identifying the determined change.

(Supplementary note 13) A computer readable recording medium storing an image processing program, wherein the image processing program causes a computer to execute:

a process of detecting a change area, where an object has changed compared to the first image, in the second image obtained by observing the same observed area as an observed area in the first image;

a process of performing a correction process to make the change area in the second image smaller relative to a non-change area where the object has not changed; and a process of outputting an image pair of the corrected processed second image and the first image.

(Supplementary note 14) A computer readable recording medium storing an image processing program, wherein the image processing program causes a computer to execute:

a process of detecting a change area, where an object has changed compared to the first image, in the second image obtained by observing the same observed area as an observed area in the first image;

a process of calculating a matching degree between the first image and the second image based on the size of the non-change area in the second image where the object has not changed; and a process of outputting an image pair of the second image and the first image when the matching degree exceeds a predetermined value.

(Supplementary note 15) An image processing program causing a computer to execute:

a process of detecting a change area, where an object has changed compared to the first image, in the second image obtained by observing the same observed area as an observed area in the first image;

a process of performing a correction process to make the change area in the second image smaller relative to a non-change area where the object has not changed; and a process of outputting an image pair of the corrected processed second image and the first image.

(Supplementary note 16) An image processing program causing a computer to execute:

a process of detecting a change area, where an object has changed compared to the first image, in the second image obtained by observing the same observed area as an observed area in the first image;

a process of calculating a matching degree between the first image and the second image based on the size of the non-change area in the second image where the object has not changed; and a process of outputting an image pair of the second image and the first image when the matching degree exceeds a predetermined value.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

1 Image processing device
10 Object map generator
20 Image pair determination unit
20A, 20B, 20C Image pair determination unit
21 Difference map generator
22 Matching degree calculator
23 Matching degree determination unit
24 Change area identification unit
25 Mask processing unit
26 Same orbit data collection unit
27 Change area identification unit
28 Change area replacement unit
30 Object map storage memory
60, 70 Image processing device
61, 71 Change area detection means
62 Image correction means
63, 73 Image pair output means
72 Matching degree calculation means
100 Satellite
211 First collapse parameter calculator
212 Second collapse parameter calculator
311 First dilation unit
312 Second dilation unit
411 Map generator
511 Noise eliminator
1001 Processor
1002 Program memory
1003 Memory

What is claimed is:

1. An image processing device comprising:

a memory storing software instructions, and one or more processors configured to execute the software instructions to detect a change area, where an object has changed compared to a first image, in a second image obtained by observing a same observed area as an observed area in the first image;

perform a correction process to make the change area in the second image smaller relative to a first non-change area where the object has not changed; and output an image pair of the corrected processed second image and the first image, wherein the one or more processors are configured to execute the software instructions to generate two deformed images by deforming object presence areas in two object presence images, which are images obtained from each of two observed images, in which one or more objects are present, and which correspond to the first image and the second image, based on an observation angle of each of the two observed images and a size of the object that appears in each of the two observed images, and generate a synthesized image by combining the two deformed images, determine a change of the object between the two object presence images using the synthesized image, and generate an image capable of identifying the determined change.

2. The image processing device according to claim 1, wherein the one or more processors are configured to execute the software instructions to replace pixel values of the change area in the second image with default values.

3. The image processing device according to claim 1, wherein the one or more processors are configured to execute the software instructions to replace the change area in the second image with a second non-change area in another image obtained by observing the same observed area as the observed area in the first image.

4. An image processing device comprising:

a memory storing software instructions, and one or more processors configured to execute the software instructions to detect a change area, where an object has changed compared to a first image, in a second image obtained by observing a same observed area as an observed area in the first image;

calculate a matching degree between the first image and the second image based on a size of a non-change area in the second image where the object has not changed; and output an image pair of the second image and the first image when the matching degree exceeds a predetermined value, wherein the one or more processors are configured to execute the software instructions to generate two deformed images by deforming object presence areas in two object presence images, which are images obtained from each of two observed images, in which one or more objects are present, and which correspond to the first image and the second image, based on an observation angle of each of the two observed images and a size of the object that appears in each of the two observed images, and generate a synthesized image by combining the two deformed images, determine a change of the object between the two object presence images using the synthesized image, and generate an image capable of identifying the determined change.

5. The image processing device according to claim 4, wherein the one or more processors are configured to execute the software instructions to calculate a percentage of a number of pixels in the non-change area to the number of pixels in a total area in the second image as the matching degree.

6. An image processing method comprising:

detecting a change area, where an object has changed compared to a first image, in a second image obtained by observing a same observed area as an observed area in the first image;

performing a correction process to make the change area in the second image smaller relative to a first non-change area where the object has not changed; and outputting an image pair of the corrected processed second image and the first image, wherein when detecting the change area, the image processing method generates two deformed images by deforming object presence areas in two object presence images, which are images obtained from each of two observed images, in which one or more objects are present, and which correspond to the first image and the second image, based on an observation angle of each of the two observed images and a size of the object that appears in each of the two observed images, and generates a synthesized image by combining the two deformed images, determine a change of the object between the two object presence images using the synthesized image, and generate an image capable of identifying the determined change.

7. The image processing method according to claim 6, wherein in the correction process, pixel values of the change area in the second image are replaced with default values.

8. The image processing method according to claim 6, wherein in the correction process, the change area in the second image is replaced with a second non-change area in another image obtained by observing the same observed area as the observed area in the first image.

* * * * *